(12) United States Patent
Niki

(10) Patent No.: US 10,822,053 B2
(45) Date of Patent: Nov. 3, 2020

(54) BICYCLE INTERNAL TRANSMISSION HUB

(71) Applicant: Shimano Inc., Osaka (JP)

(72) Inventor: Kazutaka Niki, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/801,187

(22) Filed: Nov. 1, 2017

(65) Prior Publication Data

US 2018/0170483 A1 Jun. 21, 2018

(30) Foreign Application Priority Data

Dec. 21, 2016 (JP) .................. 2016-248442

(51) Int. Cl.
| | | |
|---|---|---|
| *B62M 11/16* | (2006.01) | |
| *B62M 25/08* | (2006.01) | |
| *B62M 11/06* | (2006.01) | |
| *B62M 6/55* | (2010.01) | |

(52) U.S. Cl.
CPC ............ *B62M 11/16* (2013.01); *B62M 11/06* (2013.01); *B62M 25/08* (2013.01); *B62M 6/55* (2013.01)

(58) Field of Classification Search
CPC ........ B62M 11/16; B62M 25/08; B62M 6/55; B62M 9/12; B60B 27/00; B62J 6/12
See application file for complete search history.

(56) References Cited

U.S. PATENT DOCUMENTS

| | | | | |
|---|---|---|---|---|
| 5,855,530 A | * | 1/1999 | Huang .................... | B62M 11/18 475/288 |
| 2005/0252750 A1 | * | 11/2005 | Matsueda ............... | B62M 11/16 192/217.4 |
| 2005/0253356 A1 | | 11/2005 | Matsueda et al. | |
| 2011/0304200 A1 | * | 12/2011 | Saida ..................... | B62M 25/08 307/9.1 |
| 2014/0102237 A1 | * | 4/2014 | Jordan ................... | B62M 9/122 74/473.12 |
| 2015/0015125 A1 | * | 1/2015 | Webber .................. | B60B 1/041 310/67 A |
| 2015/0210354 A1 | * | 7/2015 | Kuroda .................. | B62M 9/12 474/70 |
| 2016/0114677 A1 | * | 4/2016 | Engelberg ............... | B62M 6/60 301/6.5 |
| 2016/0347412 A1 | | 12/2016 | Niki | |
| 2017/0334522 A1 | * | 11/2017 | Zahid ..................... | B62M 25/08 |

FOREIGN PATENT DOCUMENTS

| | | |
|---|---|---|
| CN | 103723238 A | 4/2014 |
| CN | 105142950 A | 12/2015 |
| CN | 105292374 A | 2/2016 |
| JP | 2001-522973 A | 11/2001 |
| JP | 2005-324648 A | 11/2005 |
| JP | 2005-324649 A | 11/2005 |
| WO | 99/24735 A1 | 5/1999 |

* cited by examiner

*Primary Examiner* — Zakaria Elahmadi

(74) *Attorney, Agent, or Firm* — Global IP Counselors, LLP

(57) ABSTRACT

A bicycle internal transmission hub is provided that can be easily coupled to a bicycle body. The bicycle internal transmission hub includes a hub shell, a shifting unit, and an electric actuator. The hub shell defines an accommodation cavity. The shifting unit is located in the accommodation cavity, and is configured to select one speed stage from a plurality of speed stages. The electric actuator is located in the accommodation cavity to drive the shifting unit.

19 Claims, 13 Drawing Sheets

| Gear Position | Output Side Coupling State | | | Input Side Coupling State | |
|---|---|---|---|---|---|
| | 2nd One-Way Clutch | 2nd Additional Coupling Member | 1st Additional Coupling Member | 1st One-Way Clutch | Coupling Member |
| 1st Position | Coupled | Uncoupled | Uncoupled | Coupled | Uncoupled |
| 2nd Position | Uncoupled | Coupled | Uncoupled | Coupled | Uncoupled |
| 3rd Position | Uncoupled | Uncoupled | Coupled | Coupled | Uncoupled |
| 4th Position | Coupled | Uncoupled | Uncoupled | Uncoupled | Coupled |
| 5th Position | Uncoupled | Coupled | Uncoupled | Uncoupled | Coupled |
| 6th Position | Uncoupled | Uncoupled | Coupled | Uncoupled | Coupled |

Fig.22

BICYCLE INTERNAL TRANSMISSION HUB

CROSS-REFERENCE TO RELATED APPLICATIONS

This application claims priority to Japanese Patent Application No. 2016-248442, filed on Dec. 21, 2016. The entire disclosure of Japanese Patent Application No. 2016-248442 is hereby incorporated herein by reference.

BACKGROUND

Field of the Invention

The present invention relates to a bicycle internal transmission hub.

Background Information

A known bicycle internal transmission hub changes the transmission ratio of a bicycle. Japanese Laid-Open Patent Publication No. 2005-324649 (Patent document 1) describes one example of a bicycle internal transmission hub that includes a hub axle, a drive body supported by the hub axle, and a hub shell coupled to the drive body. The bicycle internal transmission hub further includes a power transmission mechanism, which includes a plurality of gears that transmit rotational force from the drive body to the hub shell, a shift mechanism, which switches the power transmission path of the power transmission mechanism, and a positioning unit, which is coupled to the shift mechanism by a shift cable. The positioning unit is located in a drive unit arranged between a front sprocket and rear sprocket of a bicycle. In a case in which the driver operates a shift lever, the shift cable is pulled by the positioning unit to rotate the shift mechanism. This changes the coupling state of the gears of the power transmission mechanism and the hub axle. Consequently, the transmission ratio of the bicycle is switched.

SUMMARY

It is preferred that a bicycle internal transmission hub be configured so as to be easily coupled to a bicycle body.

It is an object of the present invention to provide a bicycle internal transmission hub that can be easily coupled to a bicycle body.

In accordance with a first aspect of the present invention, a bicycle internal transmission hub includes a hub shell, a shifting unit and an electric actuator. The hub shell defines an accommodation cavity. The shifting unit is located in the accommodation cavity, and is configured to select one speed stage from a plurality of speed stages. The electric actuator is located in the accommodation cavity to drive the shifting unit. The electric actuator is located in the accommodation cavity of the hub shell. Thus, the bicycle internal transmission hub can be easily coupled to a frame of a bicycle body.

In accordance with a second aspect of the present invention, the bicycle internal transmission hub according to the first aspect further includes a power generation mechanism that generates power used to drive the electric actuator. Thus, a power supply for driving the electric actuator can be omitted.

In accordance with a third aspect of the present invention, in the bicycle internal transmission hub according to the second aspect, the power generation mechanism is located in the accommodation cavity. Thus, the power generation mechanism is protected by the hub shell.

In accordance with a fourth aspect of the present invention, the bicycle internal transmission hub according to the second or third aspect further includes a power storage mechanism that stores power supplied from the power generation mechanism. Thus, power is stably supplied to the electric actuator.

In accordance with a fifth aspect of the present invention, in the bicycle internal transmission hub according to the fourth aspect, the power storage mechanism is located in the accommodation cavity. Thus, the power storage mechanism is protected by the hub shell.

In accordance with a sixth aspect of the present invention, the bicycle internal transmission hub according to any one of the first to fifth aspects further includes an electronic control unit that controls the electric actuator. Thus, the electric actuator can be actuated in accordance with various conditions.

In accordance with a seventh aspect of the present invention, in the bicycle internal transmission hub according to the sixth aspect, the electronic control unit is located in the accommodation cavity. Thus, the electronic control unit is protected by the hub shell.

In accordance with an eighth aspect of the present invention, in the bicycle internal transmission hub according to the third aspect, the hub shell includes a first end and a second end with respect to a center axis of the hub shell. The electric actuator is at least partially located toward the first end of the hub shell with respect to the shifting unit. The power generation mechanism is at least partially located toward the second end of the hub shell with respect to the shifting unit. Thus, the shifting unit, which is a heavy component, is located in the proximity of the center of the accommodation cavity of the hub shell. This optimizes the balance of weight.

In accordance with a ninth aspect of the present invention, the bicycle internal transmission hub according to the eighth aspect further includes a power storage mechanism that is located in the accommodation cavity and that stores power supplied from the power generation mechanism. The power storage mechanism is at least partially located toward the first end of the hub shell with respect to the shifting unit. Thus, the power storage mechanism is protected by the hub shell.

In accordance with a tenth aspect of the present invention, the bicycle internal transmission hub according to the ninth aspect further includes an electronic control unit that is located in the accommodation cavity and controls the electric actuator. The electronic control unit is located toward the first end of the hub shell with respect to the shifting unit. Thus, the space for the electronic control unit is easily obtained.

In accordance with an eleventh aspect of the present invention, the bicycle internal transmission hub according to the tenth aspect further includes a first support member located toward the first end of the hub shell with respect to the shifting unit to support the shifting unit. The electric actuator is located on the first support member. Thus, the electric actuator is stably arranged.

In accordance with a twelfth aspect of the present invention, the bicycle internal transmission hub according to the eleventh aspect further includes a second support member located toward the second end of the hub shell with respect to the shifting unit to support the shifting unit. The power generation mechanism is located closer to the second end of the hub shell than the second support member. Thus, the space for the power generation mechanism is easily obtained.

In accordance with a thirteenth aspect of the present invention, in the bicycle internal transmission hub according to the eleventh or twelfth aspect, the power storage mechanism is located on the first support member. Thus, the power storage mechanism is stably arranged.

In accordance with a fourteenth aspect of the present invention, in the bicycle internal transmission hub according to any one of the eleventh to thirteenth aspects, the electronic control unit is located on the first support member. Thus, the electronic control unit is stably arranged.

In accordance with a fifteenth aspect of the present invention, the bicycle internal transmission hub according to any one of the sixth, seventh, and tenth to fourteenth aspects further includes a wireless communication unit that is electrically connected to the electronic control unit to communicate with an external device. This allows an electronic controller to control the electric actuator using information received from the external device.

In accordance with a sixteenth aspect of the present invention, in the bicycle internal transmission hub according to the fifteenth aspect, the wireless communication unit is at least partially located in the accommodation cavity. Thus, the wireless communication unit is at least partially protected by the hub shell.

In accordance with a seventeenth aspect of the present invention, the bicycle internal transmission hub according to any one of the first to sixteenth aspects further includes a notification unit that issues a notification of a state of the bicycle internal transmission hub. This allows the user to easily recognize the state of the bicycle internal transmission hub.

In accordance with an eighteenth aspect of the present invention, in the bicycle internal transmission hub according to any one of the first to seventeenth aspects, the hub shell includes a shell body and a cover member. The shell body is coupled to a rim of a wheel by an intermediate member that is coupled to the rim. The cover member is rotatably arranged on the shell body. Thus, the cover member can be removed from the shell body, and the electric actuator can be removed from the accommodation cavity.

The bicycle internal transmission hub of the present invention can be easily coupled to a bicycle.

BRIEF DESCRIPTION OF THE DRAWINGS

Referring now to the attached drawings which form a part of this original disclosure:

FIG. 22 is a chart showing the relationship between the speed stages and the coupling states of the coupling members and one-way clutches for the bicycle internal transmission hub.

DETAILED DESCRIPTION OF EMBODIMENTS

The following description illustrates embodiments of a bicycle internal transmission hub according to the present invention and is not intended to be restrictive. Embodiments of the bicycle internal transmission hub according to the present invention can be modified. Further, two or more of the modified examples can be combined.

Figure 1:
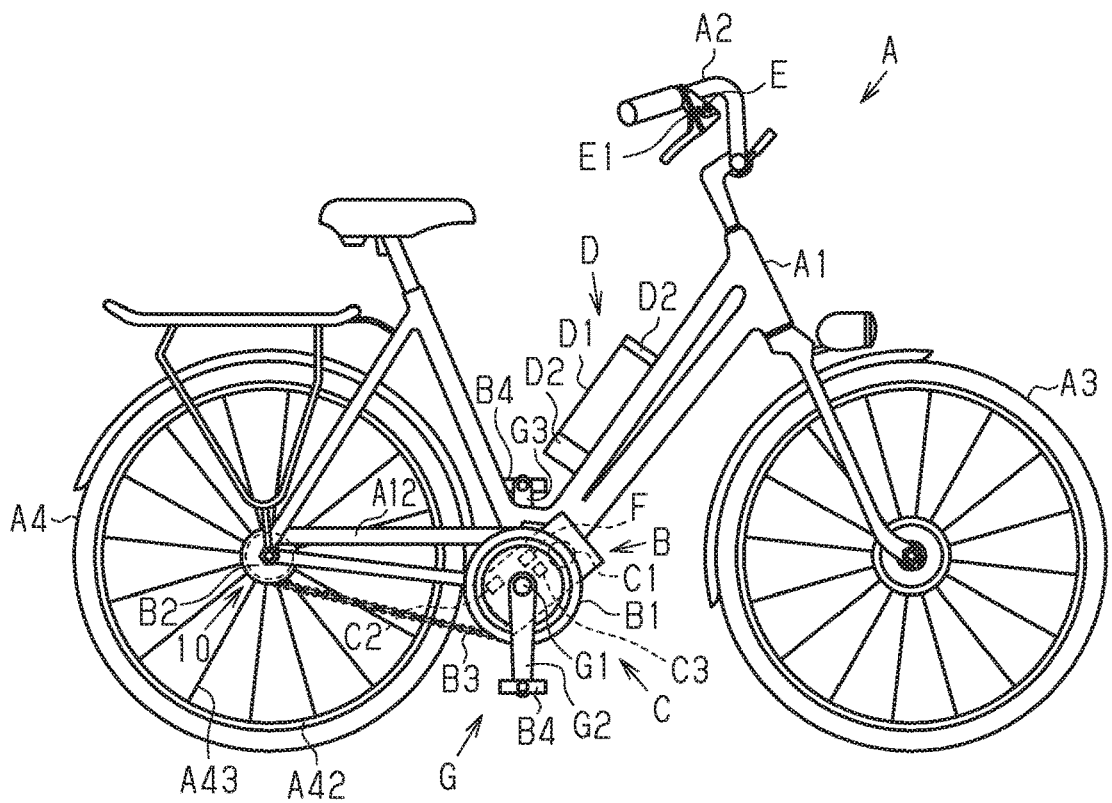
FIG. 1 is a side elevational view of a bicycle which is equipped with a bicycle internal transmission hub in accordance with one embodiment.

FIG. 1 shows one example of a bicycle A that includes a bicycle internal transmission hub 10. The bicycle A is a city bike that includes an assist mechanism C, which assists propulsion of the bicycle A using electric energy. The configuration of the bicycle A, on which the bicycle internal transmission hub 10 is mounted, can be changed to any configuration. In a first example, the bicycle A does not include the assist mechanism C. In a second example, the type of the bicycle A is a road bike, a mountain bike, or a hybrid bike. In a third example, the bicycle A has the aspects of the first example and the second example. As shown in FIG. 1, the bicycle A includes a bicycle body A1, a handlebar A2, a front wheel A3, a rear wheel A4, a drive mechanism B, the assist mechanism C, a battery unit D, a shifting operation device E, an electronic controller F and the bicycle internal transmission hub 10. The bicycle A further includes a torque sensor and a vehicle speed sensor (not shown). The bicycle body A1 includes a frame A12. The bicycle internal transmission hub 10 is coupled to the bicycle body A1. In one example, the bicycle internal transmission hub 10 is coupled to the frame A12 of the bicycle body A1.

The drive mechanism B transmits human power or muscular power to the rear wheel A4 by a chain drive, a belt drive, or a shaft drive. The drive mechanism B, which is shown in FIG. 1, includes a chain drive. The drive mechanism B includes a front sprocket B1, a rear sprocket B2, a chain B3, a crank G and two pedals B4.

The crank G includes a crankshaft G1, a right crank G2 and a left crank G3. The crankshaft G1 is rotatably supported by a bottom bracket located on the frame A12. Each of the right crank G2 and the left crank G3 is coupled to the crankshaft G1. One of the two pedals B4 is rotatably supported by the right crank G2. The other one of the two pedals B4 is rotatably supported by the left crank G3.

The front sprocket B1 is coupled to the crankshaft G1. The crankshaft G1 and the front sprocket B1 are coaxial with each other. Any structure that couples the crankshaft G1 to the front sprocket B1 is selectable. In a first example, the front sprocket B1 and the crankshaft G1 are coupled so as not to rotate relative to each other. In a second example, a one-way clutch (not shown) is located between the crankshaft G1 and the front sprocket B1. In a case where the crankshaft G1 is forwardly rotated at a higher speed than the front sprocket B1, the one-way clutch transmits the rotation of the crankshaft G1 to the front sprocket B1.

The assist mechanism C includes an assist motor C1, a drive circuit C2, a speed reduction device C3 and a one-way clutch (not shown). The assist mechanism C assists propulsion of the bicycle A. In one example, the assist mechanism C assists propulsion of the bicycle A by transmitting torque to the front sprocket B1. The torque sensor outputs a signal corresponding to the torque applied to a subject. The detection subject of the torque sensor is, for example, a crank or a pedal. In a case where the detection subject is a crank or a pedal, the torque sensor outputs a signal corresponding to the human power applied to the crank or the pedal. The specific structure of the torque sensor is selectable from various structures. In a first example, the torque sensor includes a strain sensor. In a second example, the torque sensor includes a magnetostriction sensor. In a third example, the torque sensor includes an optical sensor. In a fourth example, the torque sensor includes a pressure sensor.

The bicycle internal transmission hub 10 includes a portion (central portion) of the rear wheel A4. The rear sprocket B2 is rotatably supported by the rear wheel A4 and connected to the bicycle internal transmission hub 10. The chain B3 runs around the front sprocket B1 and the rear sprocket B2. In a case where human power applied to the two pedals B4 forwardly rotates the crank G and the front sprocket B1, the human power transmitted by the chain B3, the rear sprocket B2, and the bicycle internal transmission hub 10 forwardly rotates the rear wheel A4.

The battery unit D includes a battery D1 and a battery holder D2. The battery D1 is a battery including one or more battery cells. The battery holder D2 is fixed to the frame of the bicycle A. The battery D1 is attachable to and removable from the battery holder D2. The battery holder D2 is connected to at least each of the assist motor C1 and the bicycle internal transmission hub 10 by wires (not shown). In a case where the battery D1 is attached to the battery holder D2, the battery D1 is electrically connected to at least each of the assist motor C1 and the bicycle internal transmission hub 10.

The shifting operation device E includes an operation portion E1 that is operated by the user. One example of the operation portion E1 is one or more buttons. The shifting operation device E is connected to the bicycle internal transmission hub 10 to communicate with the bicycle internal transmission hub 10 so that a signal corresponding to an operation of the operation portion E1 is transmitted to the bicycle internal transmission hub 10. In a first example, the shifting operation device E is connected to the bicycle internal transmission hub 10 to communicate with the bicycle internal transmission hub 10 by a wire allowing for power line communication (PLC) or a communication line. In a second example, the shifting operation device E is connected to the bicycle internal transmission hub 10 to communicate with the bicycle internal transmission hub 10 by a wireless communication unit allowing for wireless communication. In a case where the operation portion E1 is operated, a signal for changing the speed stage of the bicycle internal transmission hub 10 is transmitted to the bicycle internal transmission hub 10. The bicycle internal transmission hub 10 is actuated in accordance with the signal to change the speed stage.

The electronic controller F is connected to and communicated with at least each of the bicycle internal transmission hub 10 and the assist mechanism C so as to control at least the bicycle internal transmission hub 10 and the assist mechanism C. In a first example, the electronic controller F is connected to and communicated with at least one of the bicycle internal transmission hub 10 and the assist mechanism C by a wire allowing for PLC or a communication line. In a second example, the shifting operation device E is connected to and communicated with at least one of the bicycle internal transmission hub 10 and the assist mechanism C by a wireless communication unit allowing for wireless communication. The configuration of the electronic controller F is selectable from various configurations. In a first example, the electronic controller F includes an arithmetic processing unit and a data storage unit. In a second example, the electronic controller F includes an arithmetic processing unit but does not include a data storage unit. The data storage unit is arranged separately from the electronic controller F. One example of the electronic controller F is a processor. One example of the arithmetic processing unit is a central processing unit (CPU) or a micro processing unit (MPU). One example of the data storage unit is a computer memory device.

Figure 3:
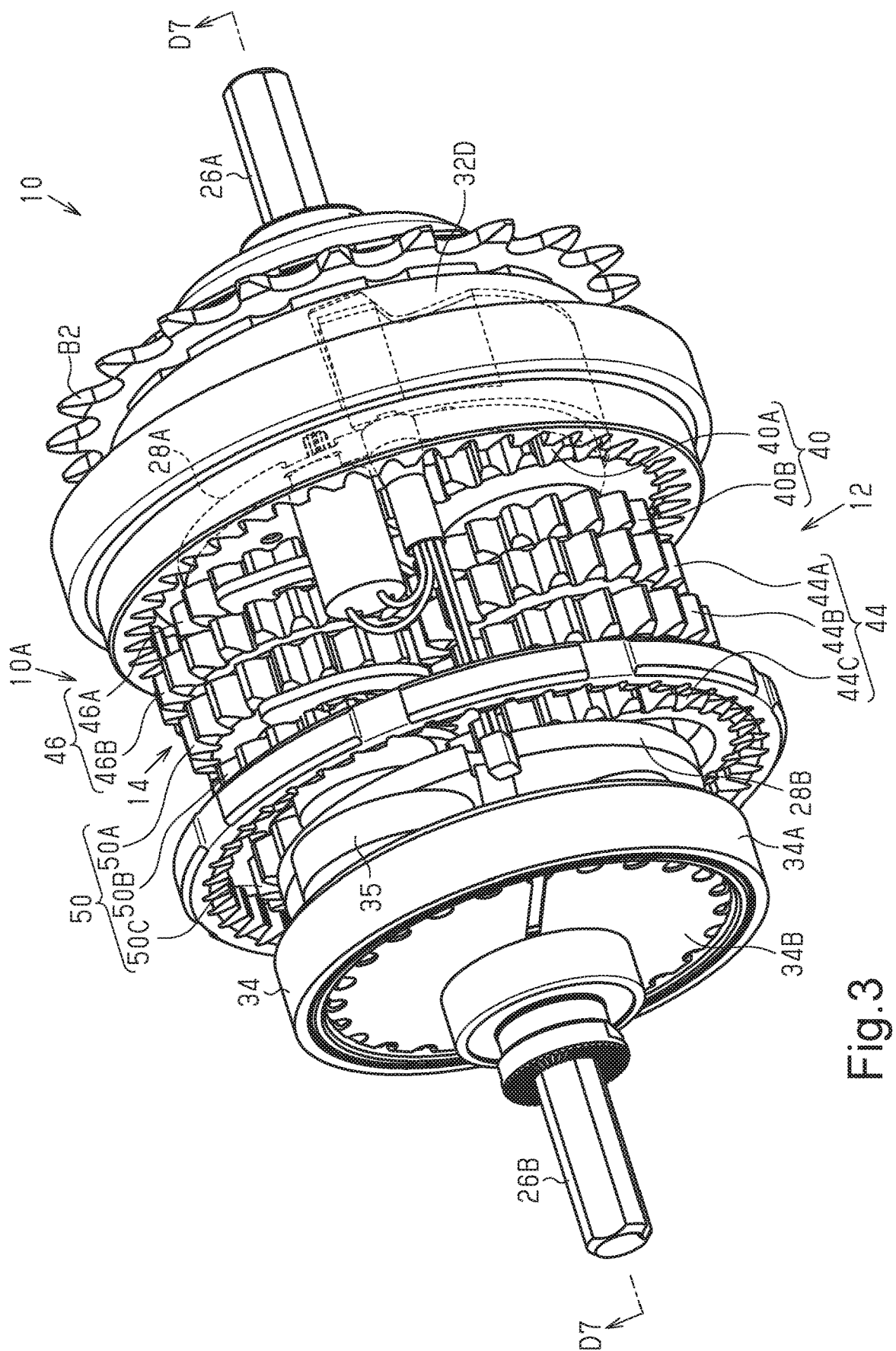
FIG. 3 is a perspective view showing the internal structure of the bicycle internal transmission hub of FIG. 2.
Figure 4:
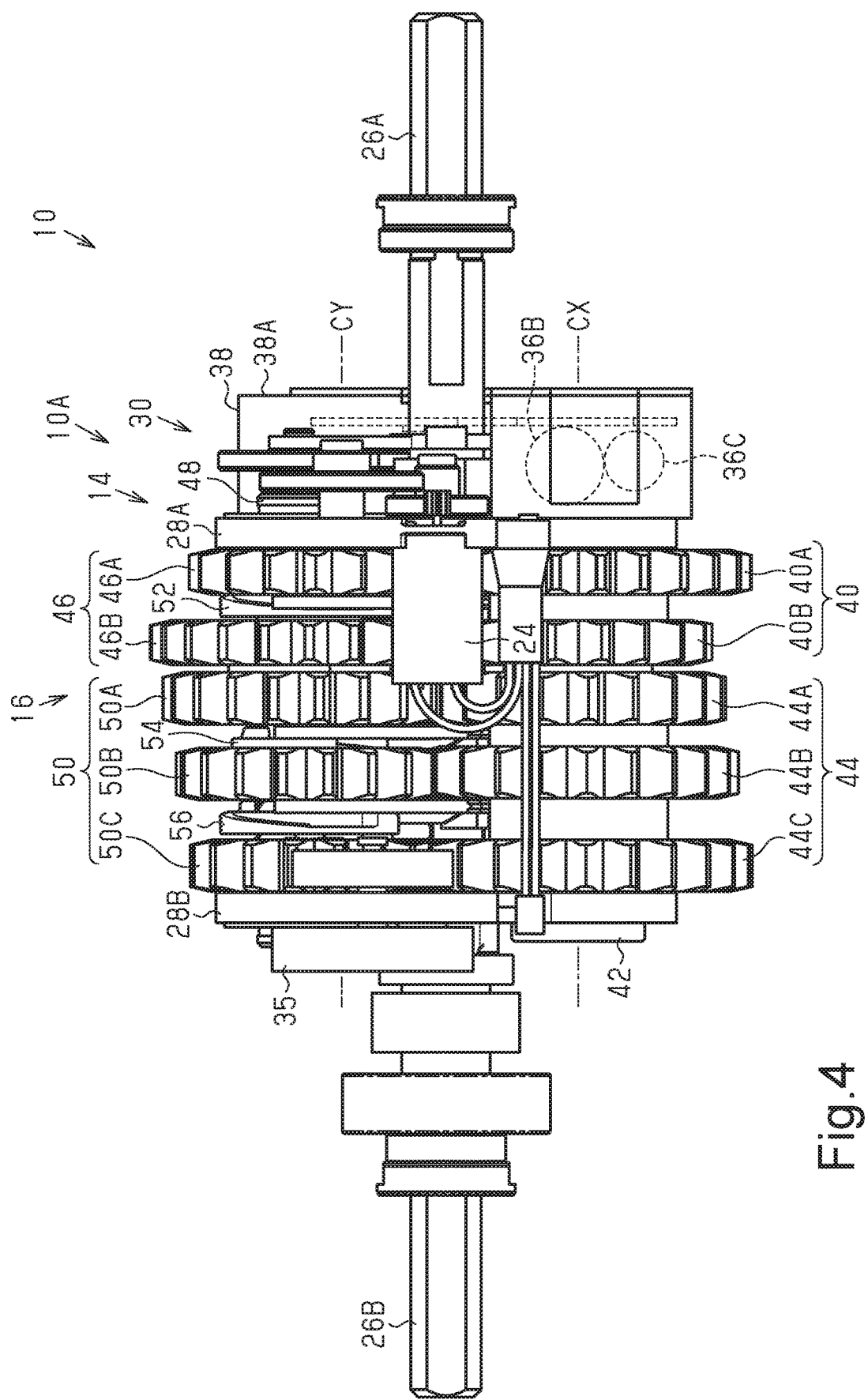
FIG. 4 is a front view showing the internal structure of the bicycle internal transmission hub of FIG. 3.

The bicycle internal transmission hub 10 is used to change the number of rotations of the rear wheel A4 relative to the number of rotations of the rear sprocket B2. The bicycle internal transmission hub 10 has a plurality of speed stages. As shown in FIGS. 3 and 4, the bicycle internal transmission hub 10 includes a hub shell 32A, a shifting unit 10A and an electric actuator 24. It is preferred that the bicycle internal transmission hub 10 include a guide portion 20 (refer to FIG. 12), a plurality of biasing members 22 (refer to FIG. 12), a pair of hub axles 26A, 26B, a first support member 28A, a second support member 28B, a gear mechanism 30, a housing 32 (refer to FIG. 2), a power generation mechanism 34 (refer to FIG. 7), a power storage mechanism 36 (refer to FIG. 7) and an electronic control unit 38 (refer to FIG. 14).

As shown in FIG. 4, the first support member 28A is located toward a first end 10B of a hub shell 32A (described later) with respect to the shifting unit 10A to support the shifting unit 10A. The second support member 28B is located toward a second end 10C of the hub shell 32A (described later) with respect to the shifting unit 10A to support the shifting unit 10A. The first transmission unit 12 includes a plurality of first rotational bodies 40, a support shaft 42 and a plurality of fourth rotational bodies 44. Human power is transmitted to the first rotational bodies 40.

The first rotational bodies 40 are arranged coaxially with the support shaft 42 and rotatable about a center axis CX of the support shaft 42. The first rotational bodies 40 are rotatably supported by the support shaft 42. The first rotational bodies 40 are located between the support member 28A and the support member 28B in an axial direction of the support shaft 42.

The first rotational bodies 40 include a first input gear 40A and a second input gear 40B. The gears 40A, 40B differ from each other in the number of teeth and the reference pitch diameter. The number of teeth in the first input gear 40A is greater than the number of teeth in the second input gear 40B. The reference pitch diameter of the first input gear 40A is greater than the reference pitch diameter of the second input gear 40B. The first input gear 40A is located closer to a first hub axle 26A than the second input gear 40B in the axial direction of the support shaft 42. In a first example, the first input gear 40A and the second input gear 40B are formed integrally with each other. In a second example, the first input gear 40A and the second input gear 40B are formed separately from each other and fixed to each other. Any material is selectable as the material forming each gear of the bicycle internal transmission hub 10. In a first example, the material forming each gear of the bicycle internal transmission hub 10 is a metal. In a second example, the material forming each gear of the bicycle internal transmission hub 10 is a synthetic resin. In a first example, the support shaft 42 is supported by the first support member 28A and the second support member 28B so that the support shaft 42 is not rotatable. In a second example, the support shaft 42 is rotatably coupled to the first support member 28A and the second support member 28B. The support shaft 42 is hollow.

Figure 2:
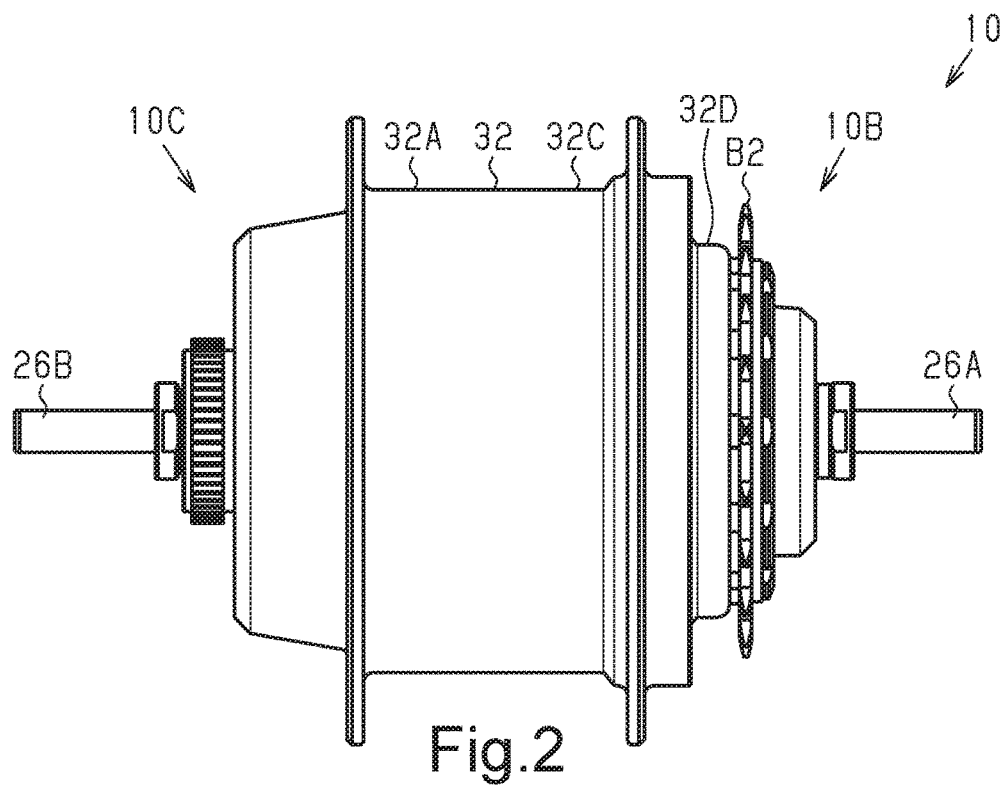
FIG. 2 is a front elevational view showing the bicycle internal transmission hub of FIG. 1.

The fourth rotational bodies 44 transmit rotation to the housing 32 (refer to FIG. 2). The fourth rotational bodies 44 include a first output gear 44A, a second output gear 44B and a third output gear 44C. The gears 44A to 44C differ from one another in the number of teeth and the reference pitch diameter. The first output gear 44A has the smallest number of teeth. The second output gear 44B has the second smallest number of teeth. The third output gear 44C has the largest number of teeth. The first output gear 44A has the smallest reference pitch diameter. The second output gear 44B has the second smallest reference pitch diameter. The third output gear 44C has the largest reference pitch diameter. In a first example, the first output gear 44A, the second output gear 44B, and the third output gear 44C are formed integrally with each another. In a second example, the first output gear 44A, the second output gear 44B and the third output gear 44C are formed separately from each another and fixed to each other.

The first output gear 44A is located closer to the first hub axle 26A than the second output gear 44B and the third output gear 44C in the axial direction of the support shaft 42. The second output gear 44B is located closer to the first hub axle 26A than the third output gear 44C in the axial direction of the support shaft 42. The second output gear 44B is located between the first output gear 44A and the third output gear 44C in the axial direction of the support shaft 42. The third output gear 44C is located closer to a second hub axle 26B than the second output gear 44B in the axial direction of the support shaft 42.

The second transmission unit 14 includes a plurality of second rotational bodies 46, a rotational shaft 48 and a plurality of third rotational bodies 50. The second rotational bodies 46 are connected to the first rotational bodies 40. The second rotational bodies 46 are arranged coaxially with the rotational shaft 48. The second rotational bodies 46 are located between the first support member 28A and the second support member 28B in an axial direction of the rotational shaft 48. The second rotational bodies 46 are rotatable about a center axis CY of the rotational shaft 48. The second rotational bodies 46 include a first input side gear 46A and a second input side gear 46B.

The gears 46A, 46B differ from each other in the number of teeth and the reference pitch diameter. The number of teeth in the first input side gear 46A is less than the number of teeth in the second input side gear 46B. The reference pitch diameter of the first input side gear 46A is smaller than the reference pitch diameter of the second input side gear 46B. The first input side gear 46A is coupled to the first input gear 40A. The first input side gear 46A is located closer to the first hub axle 26A than the second input side gear 46B in the axial direction of the rotational shaft 48. The second input side gear 46B is coupled to the second input gear 40B. The rotational shaft 48 is rotatably supported by the first support member 28A and the second support member 28B.

The third rotational bodies 50 include a first output side gear 50A, a second output side gear 50B and a third output side gear 50C. The gears 50A to 50C differ from each another in the number of teeth and the reference pitch diameter. The first output side gear 50A has the largest number of teeth. The second output side gear 50B has the second largest number of teeth. The third output side gear 50C has the smallest number of teeth. The first output side gear 50A has the largest reference pitch diameter. The second output side gear 50B has the second largest reference pitch diameter. The third output side gear 50C has the smallest reference pitch diameter.

The first output side gear 50A is located closer to the first hub axle 26A than the second output side gear 50B and the third output side gear 50C in the axial direction of the rotational shaft 48. The second output side gear 50B is located closer to the first hub axle 26A than the third output side gear 50C in the axial direction of the rotational shaft 48. The second output side gear 50B is located between the first output side gear 50A and the third output side gear 50C in the axial direction of the rotational shaft 48. The first output side gear 50A is coupled to the first output gear 44A. The second output side gear 50B is coupled to the second output gear 44B. The third output side gear 50C is coupled to the third output gear 44C.

Figure 5:
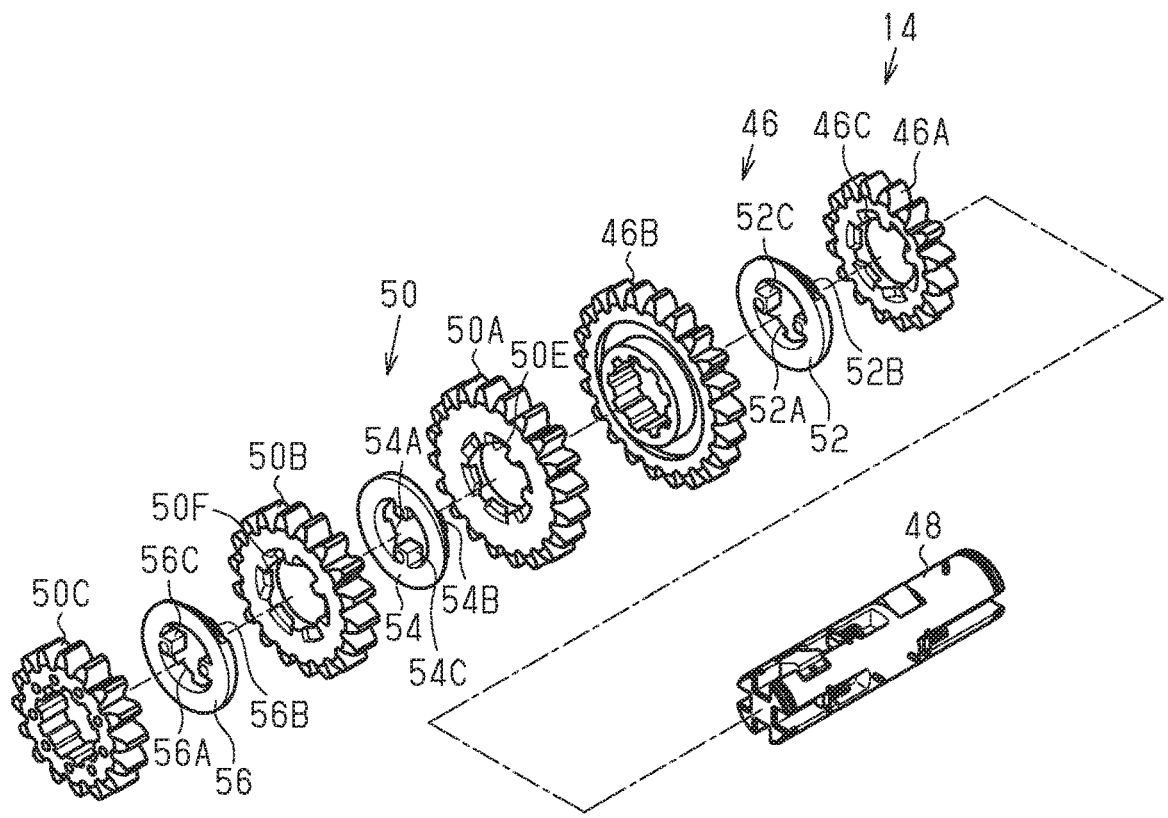
FIG. 5 is a perspective view showing second rotational bodies of the bicycle internal transmission hub of FIG. 4.
Figure 6:
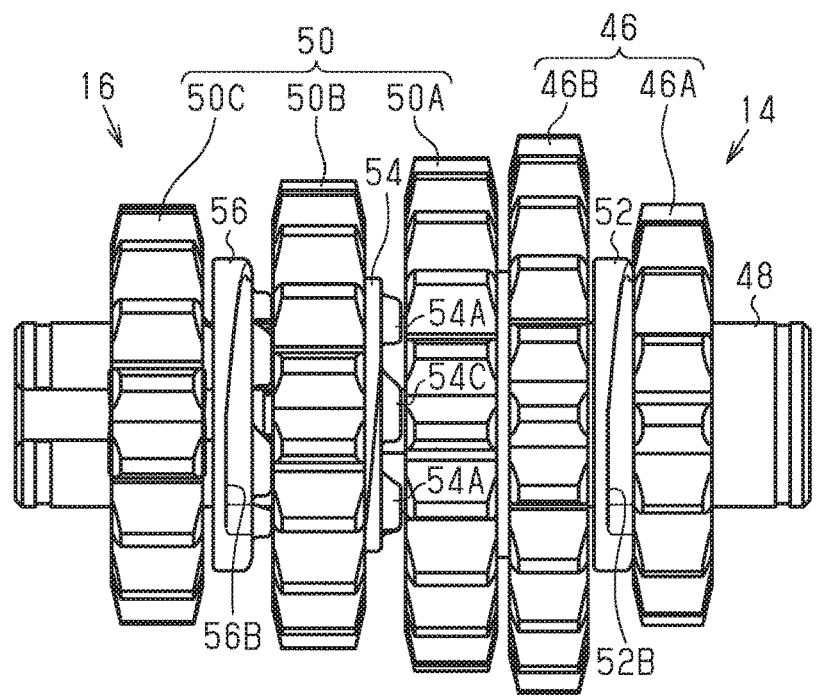
FIG. 6 is a front elevational view showing the second rotational bodies shown in FIG. 5 for the bicycle internal transmission hub.

As shown in FIGS. 5 and 6, the coupling member 16 includes the coupling member 52, a first additional coupling member 54 and a second additional coupling member 56. The coupling members 52, 54, 56 are each a ring into which the rotational shaft 48 is inserted. In this way, the rotational shaft 48 is movable relative to the coupling members 52, 54, 56 in the axial direction of the rotational shaft 48.

The coupling member 52 is movable relative to the second rotational bodies 46 in the axial direction of the rotational shaft 48. The coupling member 52 is configured to couple the second rotational bodies 46 and the rotational shaft 48. In this way, the human power transmitted from the first transmission unit 12 (refer to FIG. 4) is transmitted to the rotational shaft 48 through the second rotational bodies 46. The coupling member 52 is located between the first input side gear 46A and the second input side gear 46B in the axial direction of the rotational shaft 48. The coupling member 52 has a coupling structure that allows the coupling member 52 to be coupled to the second rotational bodies 46. In a first example shown in FIG. 5, the coupling structure includes a projection 52A, which is arranged on the coupling member 52 to be coupled to one of recesses 46C that open in a side surface of the first input side gear 46A of the second rotational bodies 46. In a second example, the coupling structure includes recesses arranged in the coupling member 52 to be coupled to a projection that projects from a side surface of the second rotational bodies 46. Any number of the coupling members 52 can be provided. In a preferred example, the number of coupling members 52 is less than the number of second rotational bodies 46. For example, in a case where n represents the number of second rotational bodies 46, n−1 represents the number of the coupling members 52. Here, n is any natural number that is two or greater. The coupling member 52 includes a cam surface 52B, which faces the side surface of the first input side gear 46A of the second rotational bodies 46. The cam surface 52B is arranged to extend nonparallel in a circumferential direction of the rotational shaft 48. The shape of the cam surface 52B is spiral.

The first additional coupling member 54 is movable relative to the third rotational bodies 50 in the axial direction of the rotational shaft 48. The first additional coupling member 54 is configured to couple the third rotational bodies 50 and the rotational shaft 48. The first additional coupling member 54 is located between the first output side gear 50A and the second output side gear 50B in the axial direction of the rotational shaft 48. The first additional coupling member 54 has a coupling structure that allows the first additional coupling member 54 to be coupled to the first output side gear 50A of the third rotational bodies 50. In a first example shown in FIG. 5, the coupling structure includes a projection 54A, which is arranged on the first additional coupling member 54 to be coupled to one of recesses 50E that open in a side surface of the first output side gear 50A of the third rotational bodies 50. In a second example, the coupling structure includes recesses arranged in the first additional coupling member 54 to be coupled to a projection that projects from the side surface of the first output side gear 50A of the third rotational bodies 50. The first additional coupling member 54 includes a cam surface 54B, which faces the side surface of the first output side gear 50A of the third rotational bodies 50. The cam surface 54B is arranged to extend nonparallel in the circumferential direction of the rotational shaft 48. The shape of the cam surface 54B is spiral.

The second additional coupling member 56 is movable relative to the third rotational bodies 50 in the axial direction of the rotational shaft 48. The second additional coupling member 56 is configured to couple the third rotational bodies 50 and the rotational shaft 48. The second additional coupling member 56 is located between the second output side gear 50B and the third output side gear 50C in the axial direction of the rotational shaft 48. The second additional coupling member 56 has a coupling structure that allows the second additional coupling member 56 to be coupled to the second output side gear 50B of the third rotational bodies 50. In a first example shown in FIG. 5, the coupling structure includes a projection 56A, which is arranged on the second additional coupling member 56 to be coupled to one of recesses 50F that open in a side surface of the second output side gear 50B of the third rotational bodies 50. In a second example, the coupling structure includes recesses arranged in the second additional coupling member 56 to be coupled to a projection that projects from the side surface of the second output side gear 50B of the third rotational bodies 50. The second additional coupling member 56 includes a cam surface 56B, which faces the side surface of the second output side gear 50B of the third rotational bodies 50. The cam surface 56B is arranged to extend nonparallel in the circumferential direction of the rotational shaft 48. The shape of the cam surface 56B is spiral.

Any number of the first additional coupling members 54 and any number of the second additional coupling members 56 can be provided. In a preferred example, the total number of the first additional coupling members 54 and the second additional coupling members 56 is less than the number of the third rotational bodies 50. For example, in a case where n represents the number of the third rotational bodies 50, n−1 represents the total number of the first additional coupling members 54 and the second additional coupling members 56. Here, n is any natural number that is two or greater.

Figure 8:
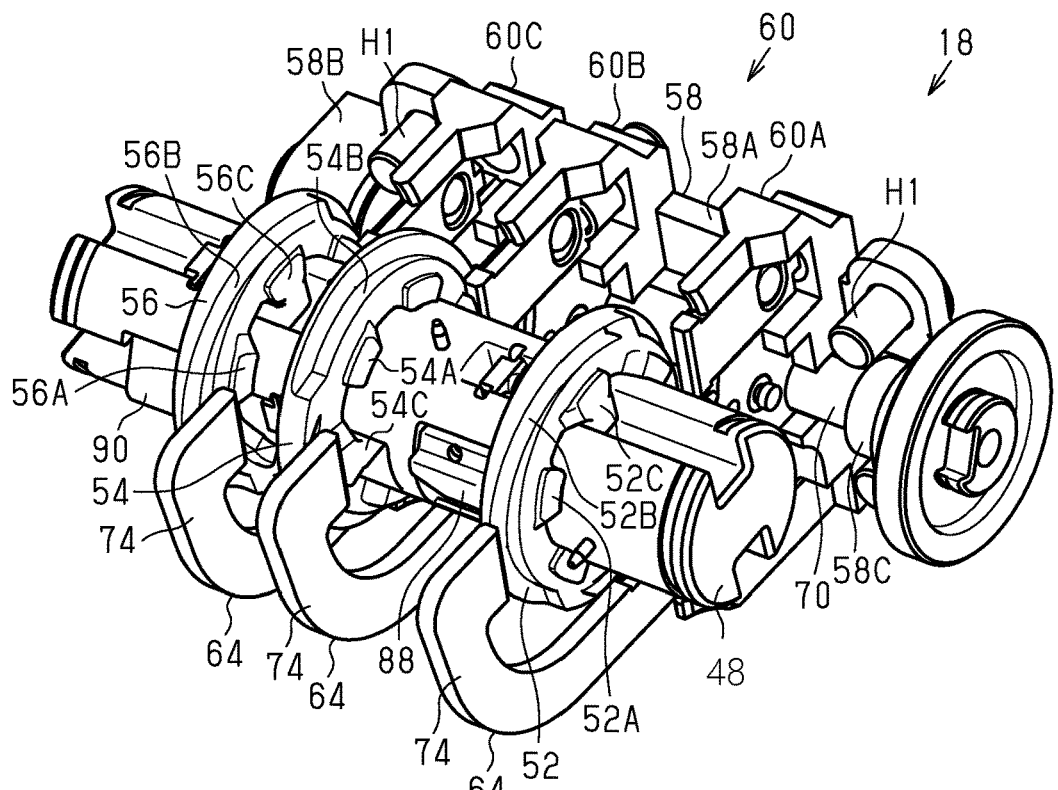
FIG. 8 is a perspective view showing first rotational bodies and a release unit shown in FIG. 4 for the bicycle internal transmission hub.

The release unit 18, which is shown in FIG. 8, moves the coupling member 52 in the axial direction of the rotational shaft 48 to uncouple the second rotational bodies 46 from the rotational shaft 48 using human power transmitted from the first transmission unit 12 (refer to FIG. 4). The release unit 18 moves the first additional coupling member 54 and the second additional coupling member 56 in the axial direction of the rotational shaft 48 to uncouple the third rotational bodies 50 from the rotational shaft 48 using the human power transmitted from the first transmission unit 12. The release unit 18 includes a support portion 58, an actuation portion 60 and a drive shaft 70.

Figure 9:
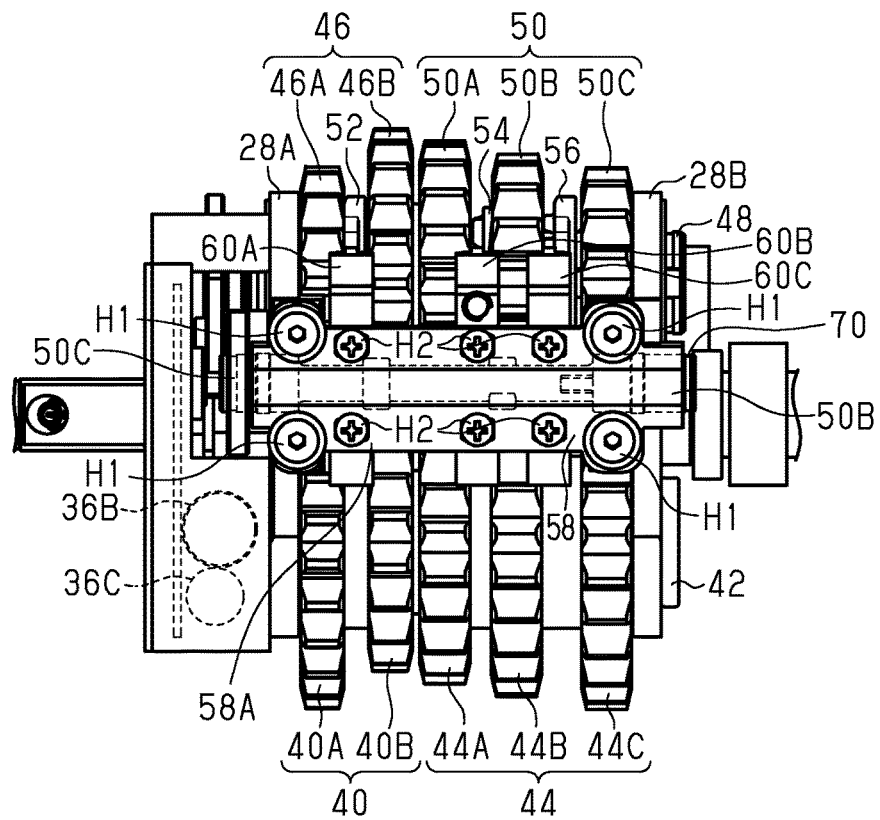
FIG. 9 is a rear elevational view showing the internal structure of the bicycle internal transmission hub of FIG. 4.

The support portion 58, which is shown in FIGS. 8 and 9, supports a plurality of actuation portions 60. The support portion 58 includes a base part 58A and shaft connection parts 58B, 58C. The base part 58A is arranged parallel to the center axis CY of the rotational shaft 48. The base part 58A extends along the center axis CY of the rotational shaft 48. The base part 58A is fastened to the first support member 28A and the second support member 28B (refer to FIG. 4) by a plurality of bolts H1.

The shaft connection part 58B is located on one end of the base part 58A. The shaft connection part 58B rotatably supports one end of the drive shaft 70. The shaft connection part 58C is located on the other end of the base part 58A. The shaft connection part 58C rotatably supports the other end of the drive shaft 70.

Figure 10:
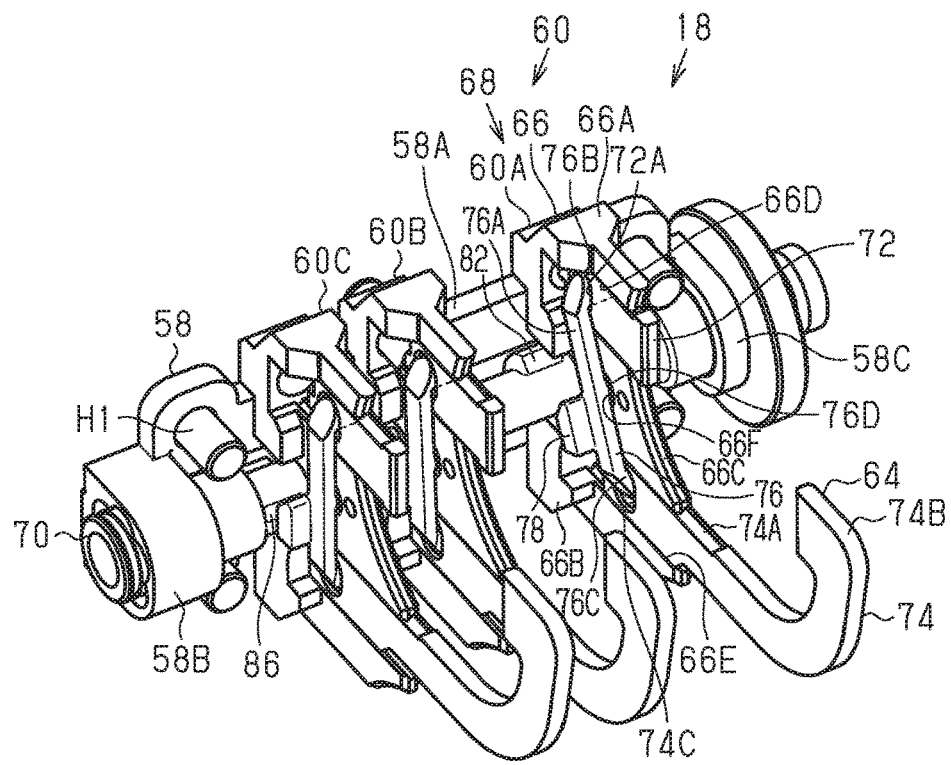
FIG. 10 is a perspective view showing a front side of the release unit shown in FIG. 8 for the bicycle internal transmission hub.
Figure 11:
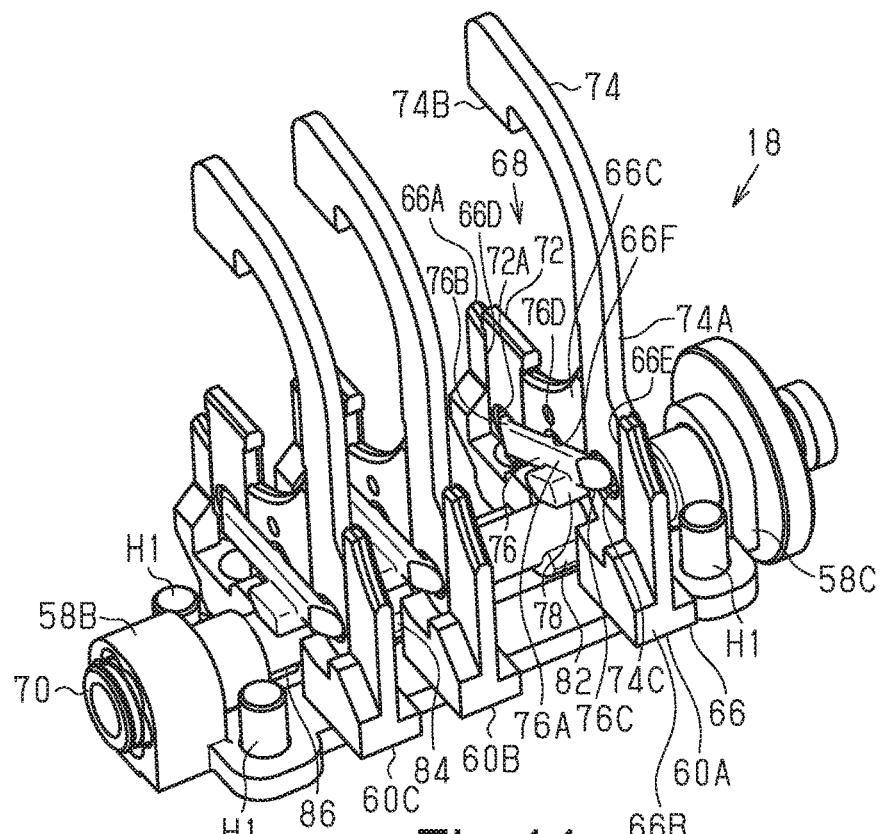
FIG. 11 is a perspective view showing a lower side of the release unit shown in FIG. 10 for the bicycle internal transmission hub.

The actuation portion 60, which is shown in FIGS. 10 and 11, includes a first actuation portion 60A, a second actuation portion 60B and a third actuation portion 60C. The actuation portions 60A to 60C are arranged in the axial direction of the rotational shaft 48. Each of the actuation portions 60A to 60C includes a contact member 64, a holder 66 and a link 68.

The contact member 64 includes a first contact member 72 and a second contact member 74. The first contact member 72 extends from the holder 66 toward the rotational shaft 48 (refer to FIG. 8). The second contact member 74 includes a first part 74A and a second part 74B. The first part 74A extends from the holder 66 toward the rotational shaft 48. The second part 74B is curved from one end of the first part 74A located closer to the rotational shaft 48 toward the first contact member 72. The distal end of the first contact member 72 faces the distal end of the second part 74B of the second contact member 74 with the rotational shaft 48 located in between.

The holder 66 is fastened to the base part 58A of the support portion 58 by a plurality of bolts H2 (refer to FIG. 9). The holder 66 includes a first part 66A, a second part 66B, a third part 66C, a first guide 66D and a second guide 66E. The first part 74A is fastened to the base part 58A by a plurality of bolts H2 at positions above the drive shaft 70. The second part 66B is fastened to the base part 58A by a plurality of bolts H2 at positions below the drive shaft 70. The third part 66C connects the first part 66A and the second part 66B. The first guide 66D is located between the first part 66A and the third part 66C. The first guide 66D supports the first contact member 72 so that the first contact member 72 is slidable relative to the holder 66. The first contact member 72 is slidable relative to the holder 66 toward the rotational shaft 48 and away from the rotational shaft 48. The second guide 66E is located between the second part 66B and the third part 66C. The second guide 66E supports the second contact member 74 so that the first part 74A of the second contact member 74 is slidable relative to the holder 66. The first part 74A of the second contact member 74 is slidable toward the rotational shaft 48 and away from the rotational shaft 48.

The link 68 is configured to convert rotation of the drive shaft 70 into translational motion and transmit the translational motion to the contact member 64. The link 68 includes a connection plate 76 and a shaft contact portion 78. The connection plate 76 connects the first contact member 72 and the second contact member 74. The connection plate 76 includes a base portion 76A, a first projection 76B, a second projection 76C and a third projection 76D.

The base portion 76A is plate-shaped and extended from the first contact member 72 toward the second contact member 74. The first projection 76B is located on one longitudinal end of the base portion 76A. The first projection 76B is inserted into a connection hole 72A that is provided in the first contact member 72. The second projection 76C is located on the other longitudinal end of the base portion 76A. The second projection 76C is inserted into a connection hole 74C that is provided in the second contact member 74. The third projection 76D is arranged at a central part of the base portion 76A in the longitudinal direction. The third projection 76D is inserted into a connection hole 66F that is provided in the third part 66C. The connection plate 76 is rotatable about the third projection 76D relative to the holder 66. The connection plate 76 is biased by a torsion coil spring (not shown) in a direction (hereafter referred to as "the first rotational direction") in which the first projection 76B approaches the drive shaft 70. The torsion coil spring is coupled to the third projection 76D. The shaft contact portion 78 is connected to the base portion 76A. The shaft contact portion 78 is contactable with the corresponding one of shaft cam surfaces 82, 84, 86 of the drive shaft 70.

The drive shaft 70 is coupled to the contact member 64 so that the contact member 64 is switched from one of a first state where the contact member 64 is spaced apart from the coupling member 16 and a second state where the contact member 64 is in contact with the coupling member 16 to the other one of the first state and the second state. The drive shaft 70 is rotatable about a center axis CZ that is separate from the center axis CY of the rotational shaft 48. The drive shaft 70 is arranged parallel to the rotational shaft 48. The drive shaft 70 includes a first shaft cam surface 82, a second shaft cam surface 84 and a third shaft cam surface 86.

The first shaft cam surface 82 is located on a position of the drive shaft 70 that is contactable with the shaft contact portion 78 of the first actuation portion 60A. The first shaft cam surface 82 switches the contact member 64 of the first actuation portion 60A from the second state, where the contact member 64 is in contact with the coupling member 52, to the first state, where the contact member 64 is not in contact with the coupling member 52.

In a state where the first shaft cam surface 82 is in contact with the shaft contact portion 78 of the first actuation portion 60A, the shaft contact portion 78 is upwardly pushed by the first shaft cam surface 82. This rotates the connection plate 76 in a second rotational direction that is opposite to the first rotational direction countering the force of the torsion coil spring. Thus, each of the contact members 72, 74 is in the first state. In a state where the first shaft cam surface 82 is not in contact with the shaft contact portion 78 of the first actuation portion 60A, each of the contact members 72, 74 is in the second state because of the force of the torsion coil spring. The cam surface 52B of the coupling member 52 (refer to FIG. 8) is configured so that in the second state, the maximum distance between the cam surface 52B and the side surface of the first input side gear 46A of the second rotational bodies 46 in the axial direction is greater than the axial dimension of the distal end of each of the contact members 72, 74.

The second shaft cam surface 84 is located on a position of the drive shaft 70 that is contactable with the shaft contact portion 78 of the second actuation portion 60B. The second shaft cam surface 84 switches each of the contact members 72, 74 of the second actuation portion 60B from the second state where the contact member 64 is in contact with the first additional coupling member 54 to the first state where each of the contact members 72, 74 is not in contact with the first additional coupling member 54.

In a state where the second shaft cam surface 84 is in contact with the shaft contact portion 78 of the second actuation portion 60B, the shaft contact portion 78 is upwardly pushed by the second shaft cam surface 84. This rotates the connection plate 76 in the second rotational direction countering the force of the torsion coil spring. Thus, each of the contact members 72, 74 is in the first state. In a state where the second shaft cam surface 84 is not in contact with the shaft contact portion 78 of the second actuation portion 60B, each of the contact members 72, 74 is in the second state because of the force of the torsion coil spring. The cam surface 54B of the first additional coupling member 54 (refer to FIG. 8) is configured so that in the second state, the maximum distance between the cam surface 54B and the side surface of the first output side gear 50A of the third rotational bodies 50 in the axial direction is greater than the axial dimension of the distal end of each of the contact members 72, 74.

The third shaft cam surface 86 is located on a position of the drive shaft 70 that is contactable with the shaft contact portion 78 of the third actuation portion 60C. The third shaft cam surface 86 switches each of the contact members 72, 74 of the third actuation portion 60C from the second state where each of the contact members 72, 74 is in contact with the second additional coupling member 56 to the first state where each of the contact members 72, 74 is not in contact with the second additional coupling member 56.

In a state where the third shaft cam surface 86 is in contact with the shaft contact portion 78 of the third actuation portion 60C, the shaft contact portion 78 is upwardly pushed by the third shaft cam surface 86. This rotates the connection plate 76 in the second rotational direction countering the force of the torsion coil spring. Thus, each of the contact members 72, 74 is in the first state. In a state where the third shaft cam surface 86 is not in contact with the shaft contact portion 78 of the third actuation portion 60C, each of the contact members 72, 74 is in the second state because of the force of the torsion coil spring. The cam surface 56B of the second additional coupling member 56 (refer to FIG. 8) is configured so that in the second state, the maximum distance between the cam surface 56B and the side surface of the second output side gear 50B of the third rotational bodies 50 in the axial direction is greater than the axial dimension of the distal end of each of the contact members 72, 74.

Figure 12:
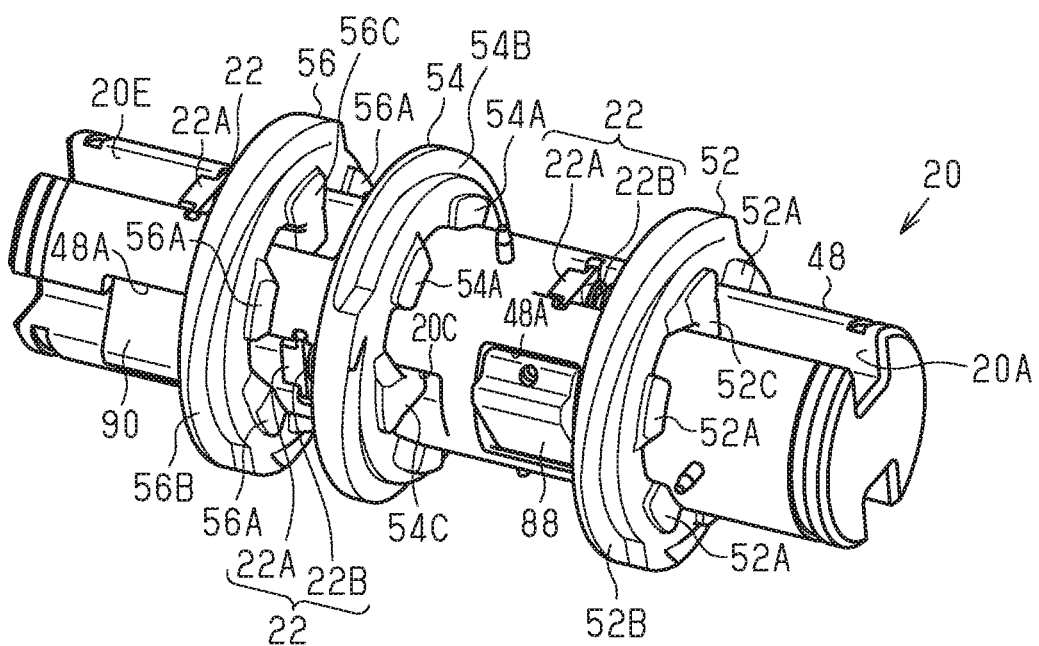
FIG. 12 is a perspective view showing a front side of a rotational shaft and coupling members shown in FIG. 4 for the bicycle internal transmission hub.
Figure 13:
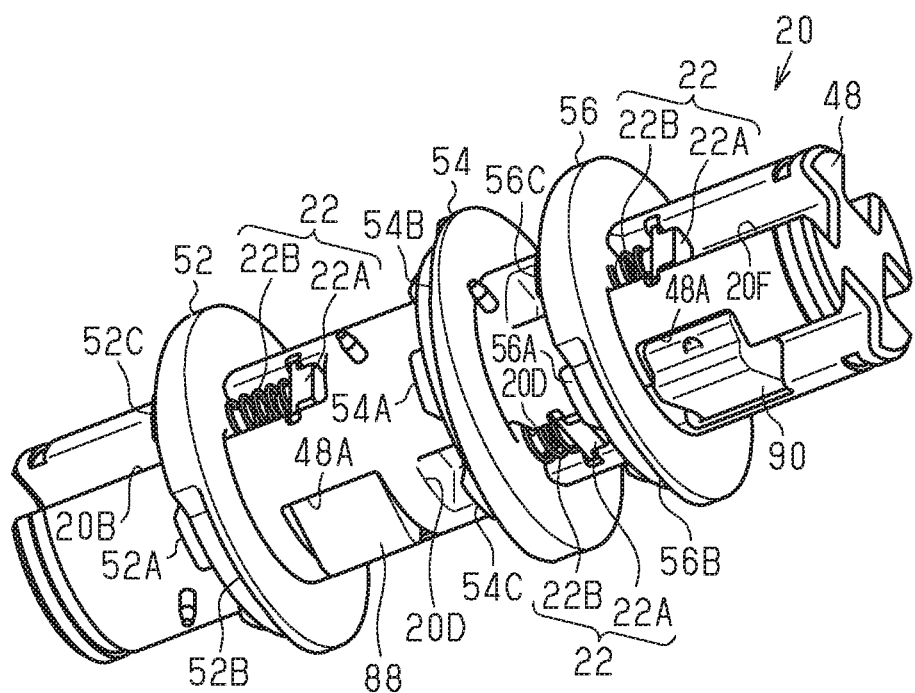
FIG. 13 is a perspective view showing a rear side of the rotational shaft and coupling members shown in FIG. 12 for the bicycle internal transmission hub.

The guide portion 20, which is shown in FIGS. 12 and 13, guides the coupling members 52, 54, 56 in the axial direction of the rotational shaft 48. The guide portion 20 has a restriction structure that restricts relative rotation of the rotational shaft 48 and each of the coupling members 52, 54, 56. For example, FIGS. 12 and 13 show one example of a restriction structure that includes a plurality of guide grooves 20A to 20F arranged in an outer circumferential portion of the rotational shaft 48 and extending in the axial direction of the rotational shaft 48.

The first guide groove 20A and the second guide groove 20B restrict the relative rotation of the rotational shaft 48 and the coupling member 52. The coupling member 52 includes two restriction projections 52C. One of the restriction projections 52C (refer to FIG. 12) projects from a side surface of the coupling member 52 toward the first guide groove 20A. The restriction projection 52C is inserted into the first guide groove 20A. The other one of the restriction projections 52C (refer to FIG. 13) projects from the side surface of the coupling member 52 toward the second guide groove 20B. The restriction projection 52C is inserted into the second guide groove 20B.

The third guide groove 20C and the fourth guide groove 20D restrict the relative rotation of the rotational shaft 48 and the first additional coupling member 54. The first additional coupling member 54 includes two restriction projections 54C. One of the restriction projections 54C (refer to FIG. 12) projects from a side surface of the first additional coupling member 54 toward the third guide groove 20C. The restriction projection 54C is inserted into the third guide groove 20C. The other one of the restriction projections 54C (refer to FIG. 13) projects from the side surface of the first additional coupling member 54 toward the fourth guide groove 20D. The restriction projection 54C is inserted into the fourth guide groove 20D.

The fifth guide groove 20E and the sixth guide groove 20F restrict the relative rotation of the rotational shaft 48 and the second additional coupling member 56. The second additional coupling member 56 includes two restriction projections 56C. One of the restriction projections 56C (refer to FIG. 12) projects from a side surface of the second additional coupling member 56 toward the fifth guide groove 20E. The restriction projection 56C is inserted into the fifth guide groove 20E. The other one of the restriction projections 56C (refer to FIG. 13) projects from the side surface of the second additional coupling member 56 toward the sixth guide groove 20F. The restriction projection 56C is inserted into the sixth guide groove 20F.

The rotational shaft 48 includes two recesses 48A. One of the recesses 48A is located between the first guide groove 20A and the second guide groove 20B in the circumferential direction of the rotational shaft 48. The recess 48A is located in a position of the rotational shaft 48 where the second input side gear 46B (refer to FIG. 4) is located. A first one-way clutch 88 and a compression spring (not shown) are arranged in the recess 48A. The first one-way clutch 88 is biased by the compression spring in a direction projecting from the recess 48A. In a case where the second input side gear 46B is forwardly rotated at a higher speed than the rotational shaft 48, the first one-way clutch 88 transmits the rotation of the second input side gear 46B to the rotational shaft 48. In a case where the rotational speed of the second input side gear 46B is lower than or equal to the rotational speed of the rotational shaft 48, the first one-way clutch 88 does not transmit the rotation of the second input side gear 46B to the rotational shaft 48.

The other one of the recesses 48A is located between the fifth guide groove 20E and the sixth guide groove 20F in the circumferential direction of the rotational shaft 48. The recess 48A is located in a position of the rotational shaft 48 where the third output side gear 50C (refer to FIG. 4) is located. A second one-way clutch 90 and a compression spring (not shown) are arranged in the recess 48A. The second one-way clutch 90 is biased by the compression spring in a direction projecting from the recess 48A. In a case where the third output side gear 50C is forwardly rotated at a higher speed than the rotational shaft 48, the second one-way clutch 90 transmits the rotation of the third output side gear 50C to the rotational shaft 48. In a case where the rotational speed of the third output side gear 50C is lower than or equal to the rotational speed of the rotational shaft 48, the second one-way clutch 90 does not transmit the rotation of the third output side gear 50C to the rotational shaft 48.

The biasing members 22 bias the coupling members 52, 54, 56 toward the second rotational bodies 46. The biasing members 22 are individually located in the first to sixth guide grooves 20A to 20F. In a first example, each of the biasing members 22 includes a metal fixture 22A and a compression spring 22B. The metal fixture 22A is fixed to the rotational shaft 48. One end of the compression spring 22B is fixed to the metal fixture 22A. The other end of the compression spring 22B is fixed to the corresponding one of the restriction projections 52C, 54C, 56C. In a second example, each of the biasing members 22 includes any elastic member. In a third example, each of the biasing members 22 includes an electrically-actuated member.

Figure 14:
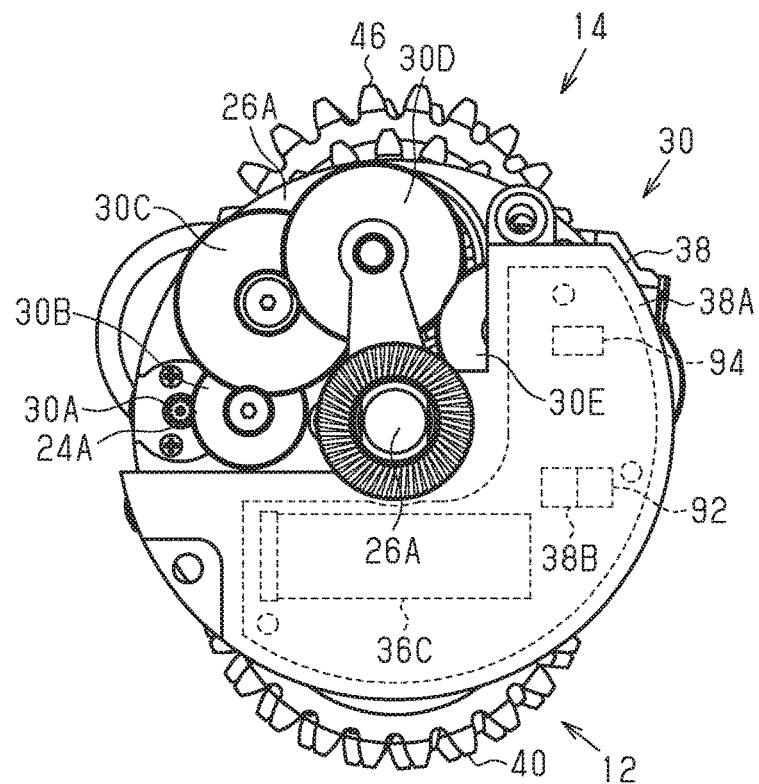
FIG. 14 is a side elevational view showing the bicycle internal transmission hub of FIG. 4.
Figure 15:
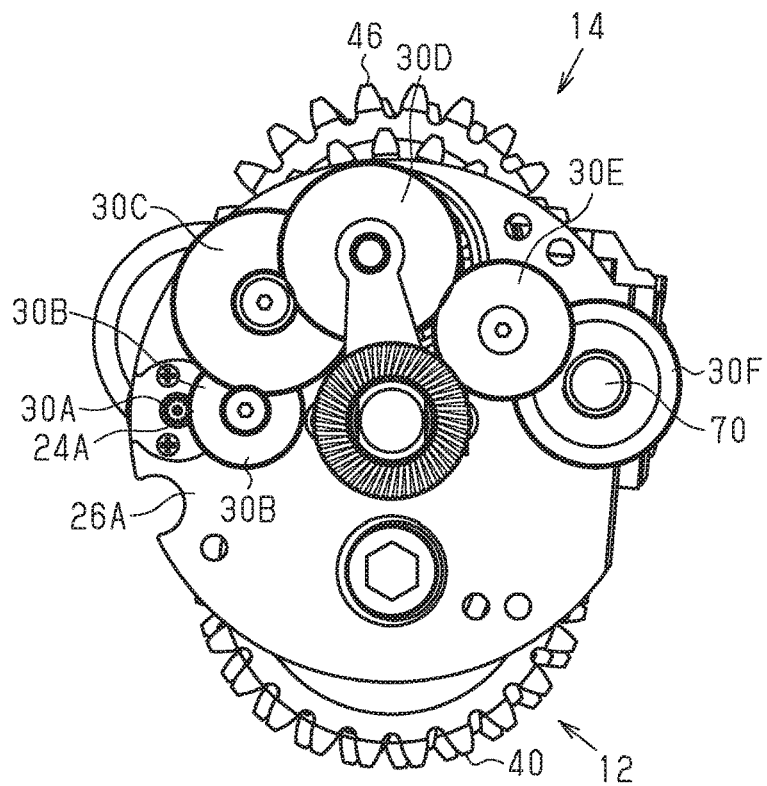
FIG. 15 is a side elevational view showing the bicycle internal transmission hub of FIG. 14 with an electronic control unit removed.

The electric actuator 24, which is shown in FIG. 4, is located in an accommodation cavity 32B to drive the shifting unit 10A. The electric actuator 24 rotates the drive shaft 70 (refer to FIG. 8). One example of the electric actuator 24 is an electric motor. The electric actuator 24 is electrically connected to the electronic control unit 38 (refer to FIG. 14) by a wire (not shown). An output shaft 24A of the electric actuator 24 is coupled to the gear mechanism 30 (refer to FIG. 14). The shifting gear mechanism 30, which is shown in FIGS. 14 and 15, reduces the speed of rotation of the output shaft 24A of the electric actuator 24 and transmits the rotation to the drive shaft 70, The shifting gear mechanism 30 includes a first gear 30A, a second gear 30B, a third gear 30C, a fourth gear 30D, a fifth gear 30E, and a sixth gear 30F. The gear mechanism 30 can be a speed increasing mechanism that increases the speed of rotation of the output shaft 24A of the electric actuator 24 and transmits the rotation to the drive shaft 70.

The first gear 30A is coupled to the output shaft 24A of the electric actuator 24. The second to fifth gears 30B to 30E are rotatably supported by the first support member 28A. The second gear 30B is coupled to the first gear 30A. The third gear 30C is coupled to the second gear 30B. The fourth gear 30D is coupled to the third gear 30C. The fifth gear 30E is coupled to the fourth gear 30D. The sixth gear 30F is coupled to the end of the drive shaft 70 that is inserted into the first support member 28A.

Figure 7:
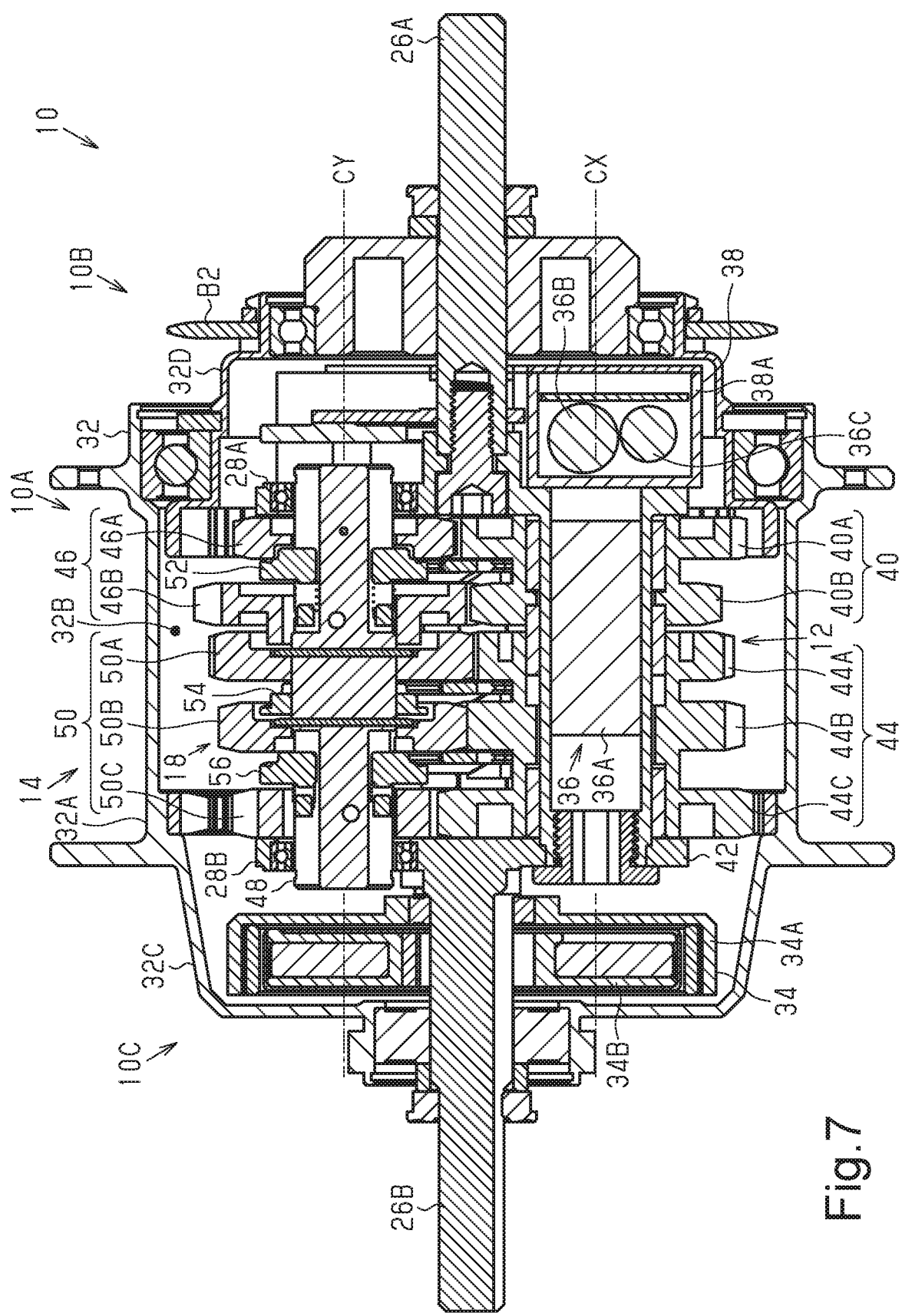
FIG. 7 is a cross-sectional view of the bicycle internal transmission hub taken along line D7-D7 in FIG. 3.

The power generation mechanism 34, which is shown in FIG. 7, is located in the accommodation cavity 32B of the housing 32. One example of the power generation mechanism 34 is a dynamo. The power storage mechanism 36 stores power supplied from the power generation mechanism 34. The power storage mechanism 36 is electrically connected to the power generation mechanism 34 and the electronic control unit 38 by wires (not shown). The power storage mechanism 36 stores power generated by the power generation mechanism 34. The power storage mechanism 36 includes a first capacitor 36A, a second capacitor 36B, and an electrolytic capacitor 36C. The first capacitor 36A is located in the hollow support shaft 42. More specifically, the first capacitor 36A of the power storage mechanism 36 is located in the first support member 28A through the support shaft 42. The second capacitor 36B and the electrolytic capacitor 36C are located in a housing 38A of the electronic control unit 38.

The housing 32 accommodates the first transmission unit 12, the second transmission unit 14, the coupling member 16 and the release unit 18. In one example, the housing 32 includes the hub shell 32A. The hub shell 32A includes a shell body 32C and a cover member 32D. The shell body 32C is coupled to a rim A42 (refer to FIG. 1), which forms a wheel of the rear wheel A42, by an intermediate member A43 (refer to FIG. 1) coupled to the rim A42. The cover member 32D is rotatable arranged on the shell body 32C. In one example, the cover member 32D includes a freewheel. The hub shell 32A includes the first end 10B and the second end 10C (refer to FIG. 7) with respect to the center axis. The electric actuator 24 is at least partially located toward the first end 10B of the hub shell 32A with respect to the shifting unit 10A. The power generation mechanism 34 is at least partially located toward the second end 10C of the hub shell 32A with respect to the shifting unit 10A. The gear mechanism 30 is at least partially located toward the first end 10B of the hub shell 32A with respect to the shifting unit 10A. The power storage mechanism 36 is at least partially located toward the first end 10B of the hub shell 32A with respect to the shifting unit 10A. The electronic control unit 38 is at least partially located toward the first end 10B of the hub shell 32A with respect to the shifting unit 10A. More specifically, the electric actuator 24 is located on the first support member 28A. The electric actuator 24 is arranged to overlap the shifting unit 10A as viewed in a radial direction of the hub shell 32A. The drifting gear mechanism 30 is located on the first support member 28A at a position opposite to the shifting unit 10A. The power storage mechanism 36 is located at least partially located on the first support member 28A at a position opposite to the shifting unit 10A. The electronic control unit 38 is located on the first support member 28A at a position opposite to the shifting unit 10A.

As shown in FIG. 3, the power generation mechanism 34 is located closer to the second end 10C of the hub shell 32A (refer to FIG. 2) than the second support member 28B. The power generation mechanism 34 includes a rotor 34A including a magnet and a stator 34B including a coil. The rotor 34A is coupled to the shifting unit 10A by a gear mechanism 35, which is located on the second support member 28B at a position opposite to the shifting unit 10A. In a first example, the gear mechanism 35 increases the speed of rotation of the shifting unit 10A and transmits the rotation to the rotor 34A. In a second example, the gear mechanism 35 reduces the speed of rotation of the shifting unit 10A and transmits the rotation to the rotor 34A.

The electronic control unit 38 includes the housing 38A and an electronic controller 38B. The housing 38A is coupled to the first support member 28A. The electronic controller 38B is located in the housing 38A. The electronic controller 38B is connected to and communicated with the electric actuator 24 (refer to FIG. 4) and the shifting operation device E (refer to FIG. 1).

The electronic controller 38B includes a computer memory device (not shown). The computer memory device stores programs in advance that are executed by the electronic controller 38B. The electronic controller 38B calculates cadence of the crankshaft G1 and a traveling speed of the bicycle A based on the programs stored in the computer memory device. The electronic controller 38B calculates the transmission ratio of the bicycle internal transmission hub 10 from the rotational speed of the first rotational bodies 40 and the rotational speed of one of the gears in the fourth rotational bodies 44 to specify the current speed stage. The correspondence relationship between the transmission ratio and the speed stage is stored in the memory in advance. The bicycle internal transmission hub 10 further includes a wireless communication unit 92 (refer to FIG. 14), which is electrically connected to the electronic control unit 38 so as to communicate with an external device (not shown). The wireless communication unit 92 is at least partially located in the accommodation cavity 32B. The bicycle internal transmission hub 10 further includes a notification unit 94, which detects the state of the bicycle internal transmission hub 10. The notification unit 94 is at least partially located in the accommodation cavity 32B.

In a case where a shift up operation is performed on the operation portion E1, the shifting operation device E (refer to FIG. 1) outputs a shifting signal that includes a shift up signal. In a case where a shift down operation is performed on the operation portion E1, the shifting operation device E outputs a shifting signal that includes a shift down signal. The shifting signal is transmitted to the electronic controller 38B. In a case where the electronic controller 38B receives a shifting signal including the shift up signal, the electronic controller 38B controls the electric actuator 24 so that the transmission ratio is changed to a transmission ratio that is designated by the shift up signal. In one example, the electronic controller 38B controls the electric actuator 24 so that the rotational angle of the drive shaft 70 is changed from the rotational angle that corresponds to the present transmission ratio to the rotational angle that corresponds to the transmission ratio designated by the shift up signal. In a case where the electronic controller 38B receives a shifting signal that includes a shift down signal, the electronic controller 38B controls the electric actuator 24 so that the transmission ratio is changed to a transmission ratio that is designated by the shift down signal. In one example, the electronic controller 38B controls the electric actuator 24 so that the rotational angle of the drive shaft 70 changes from the rotational angle that corresponds to the present transmission ratio to the rotational angle that corresponds to the transmission ratio designated by the shift down signal.

FIG. 22 shows the relationship between the coupling state of the bicycle internal transmission hub 10 and the speed stage of the bicycle internal transmission hub 10. In one example, speed stages selectable by the bicycle internal transmission hub 10 are six, namely, a first speed stage to a sixth speed stage. The transmission ratio of the bicycle internal transmission hub 10 decreases in the order from the first speed stage to the sixth speed stage. In FIG. 22, "Coupled State" indicates a state where each of the coupling members 52, 54, 56 and the one-way clutches 88, 90 is coupled to the corresponding one of the gears. In FIG. 22, "Uncoupled State" indicates a state where each of the coupling members 52, 54, 56 and the one-way clutches 88, 90 is not coupled to the corresponding one of the gears.

Figure 16:
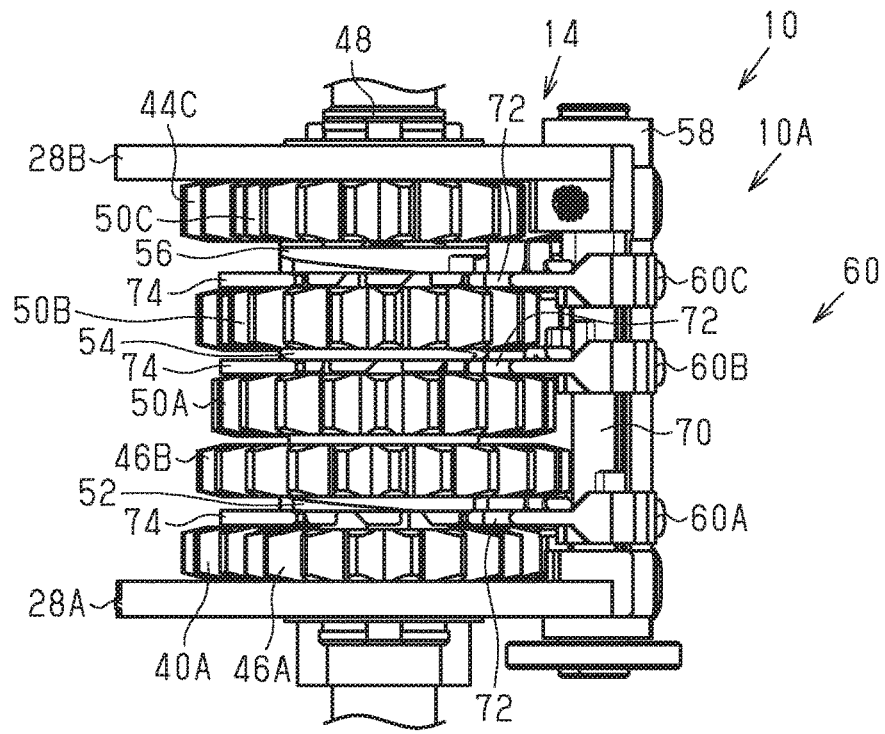
FIG. 16 is a plan view of the bicycle internal transmission hub that is in a first speed stage.

As shown in FIG. 16, in a case where the rotational angle of the drive shaft 70 is adjusted so that the contact member 64 of each of the actuation portions 60A to 60C is in the second state, each of the first one-way clutch 88 and the second one-way clutch 90 is in the coupled state. Each of the coupling member 52, the second additional coupling member 56, and the first additional coupling member 54 is in the uncoupled state. Thus, the speed stage is set to the first speed stage.

Figure 17:
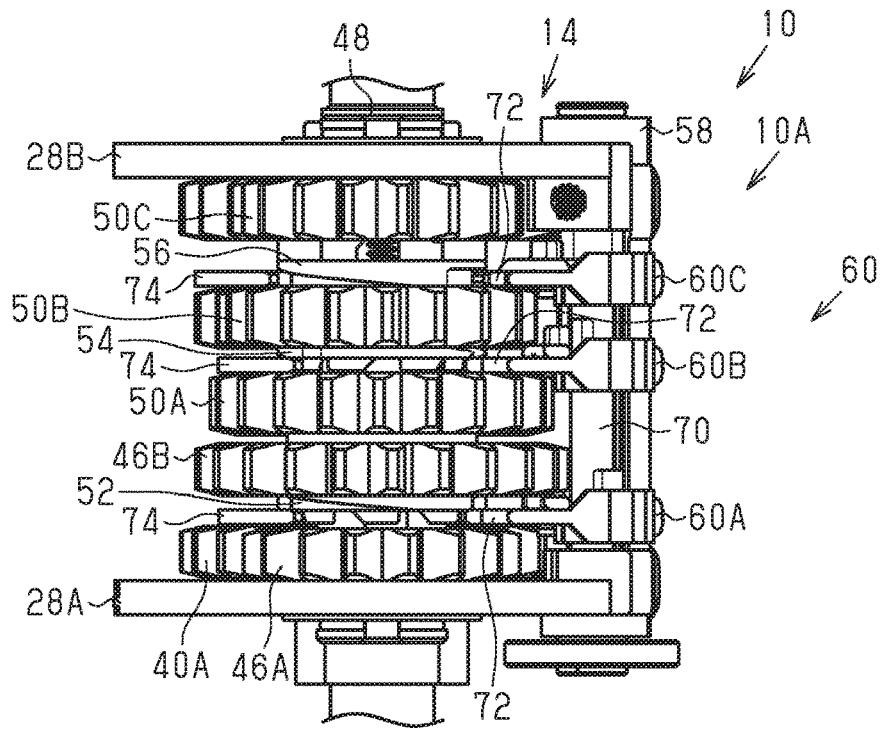
FIG. 17 is a plan view of the bicycle internal transmission hub that is in a second speed stage.

As shown in FIG. 17, in a case where the rotational angle of the drive shaft 70 is adjusted so that the contact member 64 of each of the first actuation portion 60A and the second actuation portion 60B is set to the second state and so that the contact member 64 of the third actuation portion 60C is set to the first state, each of the first one-way clutch 88 and the second additional coupling member 56 is in the coupled state. Each of the coupling member 52, the second one-way clutch 90, and the first additional coupling member 54 is in the uncoupled state. Thus, the speed stage is set to the second speed stage.

Figure 18:
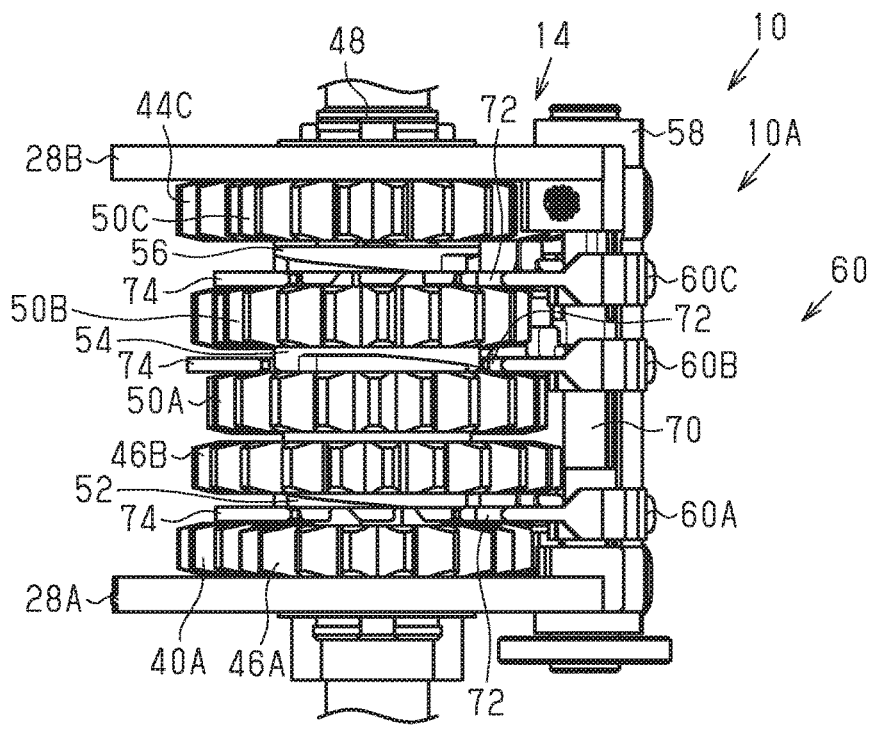
FIG. 18 is a plan view of the bicycle internal transmission hub that is in a third speed stage.

As shown in FIG. 18, in a case where the rotational angle of the drive shaft 70 is adjusted so that the contact member 64 of each of the first actuation portion 60A and the third actuation portion 60C is set to the second state and so that the contact member 64 of the second actuation portion 60B is set to the first state, each of the first one-way clutch 88 and the first additional coupling member 54 is in the coupled state. Each of the coupling member 52, the second one-way clutch 90, and the second additional coupling member 56 is in the uncoupled state. Thus, the speed stage is set to the third speed stage.

Figure 19:
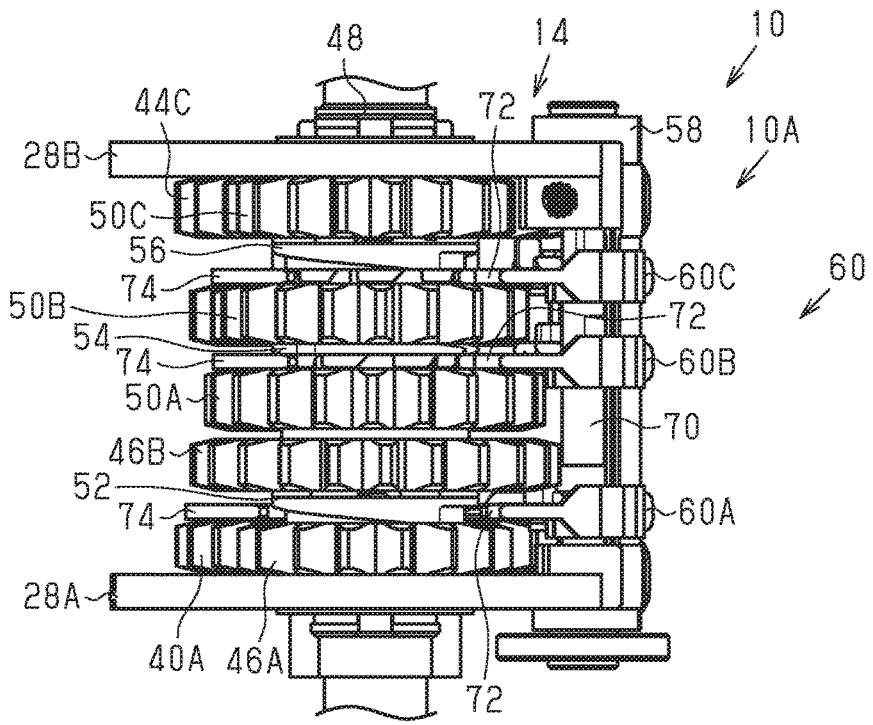
FIG. 19 is a plan view of the bicycle internal transmission hub that is in a fourth speed stage.

As shown in FIG. 19, in a case where the rotational angle of the drive shaft 70 is adjusted so that the contact member 64 of the first actuation portion 60A is set to the first state and so that the contact member 64 of each of the second actuation portion 60B and the third actuation portion 60C is set to the second state, each of the coupling member 52 and the second one-way clutch 90 is in the coupled state. Each of the first one-way clutch 88, the second additional coupling member 56, and the first additional coupling member 54 is in the uncoupled state. Thus, the speed stage is set to the fourth speed stage.

Figure 20:
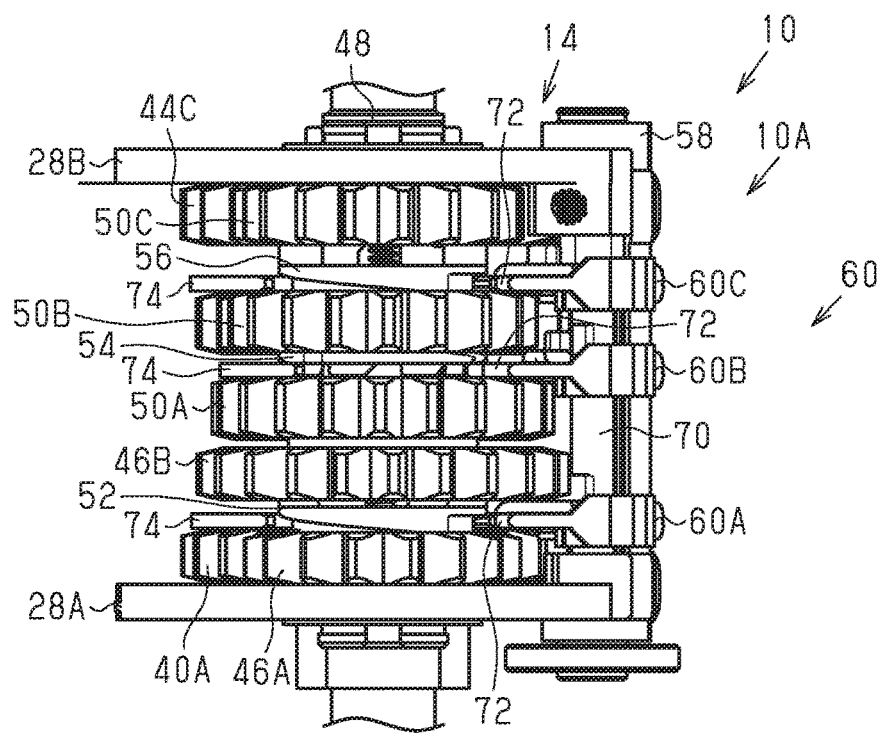
FIG. 20 is a plan view of the bicycle internal transmission hub that is in a fifth speed stage.

As shown in FIG. 20, in a case where the rotational angle of the drive shaft 70 is adjusted so that the contact member 64 of each of the first actuation portion 60A and the third actuation portion 60C is set to the first state and so that the contact member 64 of the second actuation portion 60B is set to the second state, each of the coupling member 52 and the second additional coupling member 56 is in the coupled state. Each of the first one-way clutch 88, the second one-way clutch 90, and the first additional coupling member 54 is in the uncoupled state. Thus, the speed stage is set to the fifth speed stage.

Figure 21:
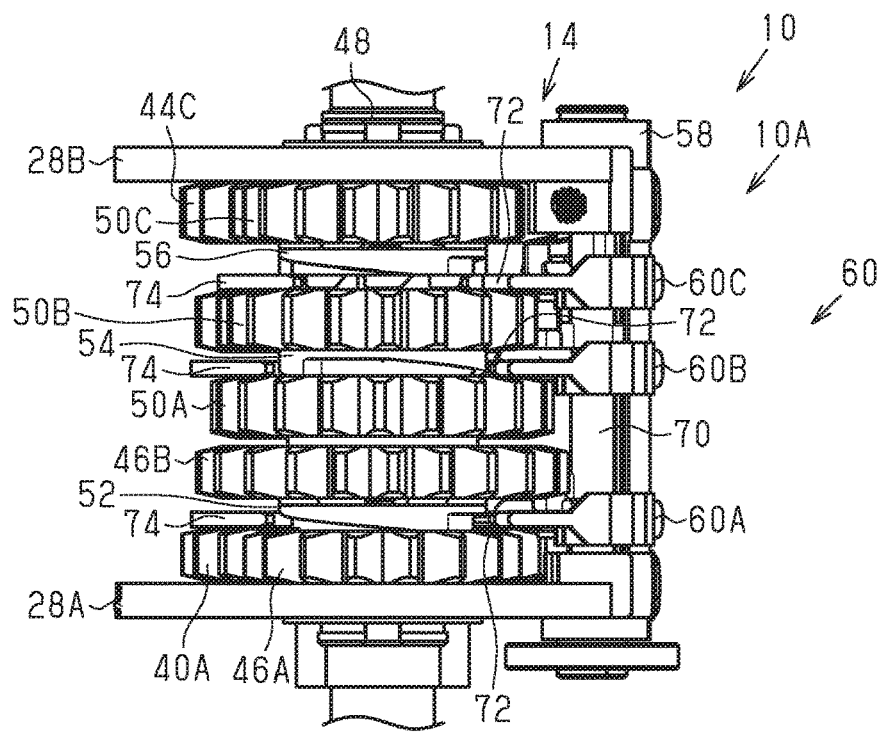
FIG. 21 is a plan view of the bicycle internal transmission hub that is in a sixth speed stage.

As shown in FIG. 21, in a case where the rotational angle of the drive shaft 70 is adjusted so that the contact member 64 of each of the first actuation portion 60A and the second actuation portion 60B is set to the first state and so that the contact member 64 of the third actuation portion 60C is set to the second state, each of the coupling member 52 and the first additional coupling member 54 is in the coupled state. Each of the first one-way clutch 88, the second one-way clutch 90, and the second additional coupling member 56 is in the uncoupled state. Thus, the speed stage is set to the sixth speed stage.

For example, in a case where the speed stage is changed from the third speed stage to the fourth speed stage, the electric actuator 24 rotates the drive shaft 70 so that the rotational angle of the drive shaft 70 is changed from the angle that corresponds to the third speed stage to the angle that corresponds to the fourth speed stage. In a case where the rotational angle of the drive shaft 70 is changed from the angle corresponding to the third speed stage to an angle between the angle corresponding to the third speed stage and the angle corresponding to the fourth speed stage, each of the contact members 72, 74 of the first actuation portion 60A is set to the first state. Each of the contact members 72, 74 of the second actuation portion 60B is set to the second state.

In a state where each of the contact members 72, 74 of the first actuation portion 60A is in the first state, the biasing force of the biasing members 22 moves the coupling member 52 relative to the rotational shaft 48 in a first direction. Consequently, the projection 52A of the coupling member 52 is inserted into one of the recesses 46C of the first input side gear 46A, or the projection 52A of the coupling member 52 is forced against the side surface of the first input side gear 46A. In a case where the projection 52A is inserted into the recess 46C, the first input side gear 46A is coupled to the coupling member 52. The first input side gear 46A and the rotational shaft 48 are in the coupled state in terms of power transmission.

The first input side gear 46A is coupled to the first input gear 40A. The first input gear 40A is coupled to the support shaft 42. Thus, in a case where the support shaft 42 is rotated by human power, the first input gear 40A and the first input side gear 46A are also rotated by the human power. The first input side gear 46A is uncoupled from the support shaft 42 in terms of power transmission. Thus, the rotational force transmitted from the first input gear 40A rotates the first input side gear 46A about the rotational shaft 48 relative to the support shaft 42. In a state where the projection 52A of the coupling member 52 is forced against the side surface of the first input side gear 46A, if the first input side gear 46A is rotated to conform the rotational position of the recess 46C of the first input side gear 46A to the rotational position of the projection 52A of the coupling member 52, the projection 52A is inserted into the recess 46C. This couples the first input side gear 46A and the coupling member 52. Thus, the first input side gear 46A and the support shaft 42 are in the coupled state in terms of power transmission.

In a case where each of the contact members 72, 74 of the second actuation portion 60B is changed from the first state to the second state, the first output side gear 50A and the first additional coupling member 54 are changed from the coupled state to the uncoupled state as described below.

The first output side gear 50A is coupled to the second input side gear 46B. The second input side gear 46B is coupled to the support shaft 42. Thus, in a case where the support shaft 42 is rotated by human power, the second input side gear 46B and the first output side gear 50A are also rotated by the human power. In a state where each of the contact members 72, 74 of the second actuation portion 60B is in contact with the cam surface 54B of the first additional coupling member 54, rotation of the first output side gear 50A moves the contact members 72, 74 in the circumferential direction of the center axis CY of the rotational shaft 48 the cam surface 54B to relatively narrow the gap between the cam surface 54B and the side surface of the first output side gear 50A. This moves the first additional coupling member 54 in a second direction of the direction extending along the center axis CY of the rotational shaft 48 to widen the gap between the cam surface 54B and the side surface of the first output side gear 50A. This disengages the projection 54A of the first additional coupling member 54 from the recess 50E of the first output side gear 50A. Consequently, the first additional coupling member 54 and the first output side gear 50A are in the uncoupled state. Accordingly, the first output side gear 50A and the rotational shaft 48 are in the uncoupled state in terms of power transmission.

What is claimed is:

1. A bicycle internal transmission hub comprising:
a hub housing including a hub shell having a cylindrical shape and configured to be coupled to a bicycle wheel rim, the hub shell defining an accommodation cavity inside the cylindrical shape;
a hub axle;
a shifting unit located in the accommodation cavity and configured to select one speed stage from a plurality of speed stages;
a drive shaft arranged to drive the shifting unit via a link configured to convert rotation of the drive shaft into translational motion of a contact member;
an electric actuator located in the accommodation cavity to drive the shifting unit, the electric actuator having an output shaft arranged parallel to the hub axle; and
a gear mechanism including at least one gear, the gear mechanism being disposed between the output shaft and the drive shaft such that rotation of the output shaft is transmitted to the drive shaft through the gear mechanism.

2. The bicycle internal transmission hub according to claim 1, further comprising
a power generation mechanism that generates power used to drive the electric actuator.

3. The bicycle internal transmission hub according to claim 2, wherein
the power generation mechanism is located in the accommodation cavity.

4. The bicycle internal transmission hub according to claim 2, further comprising
a power storage mechanism that stores power supplied from the power generation mechanism.

5. The bicycle internal transmission hub according to claim 4, wherein
the power storage mechanism is located in the accommodation cavity.

6. The bicycle internal transmission hub according to claim 1, further comprising
an electronic control unit that controls the electric actuator.

7. The bicycle internal transmission hub according to claim 6, wherein
the electronic control unit is located in the accommodation cavity.

8. The bicycle internal transmission hub according to claim 3, wherein
the hub shell includes a first end and a second end with respect to a center axis of the hub shell,
the electric actuator is at least partially located toward the first end of the hub shell with respect to the shifting unit, and
the power generation mechanism is at least partially located toward the second end of the hub shell with respect to the shifting unit.

9. The bicycle internal transmission hub according to claim 8, further comprising
a power storage mechanism located in the accommodation cavity and that stores power supplied from the power generation mechanism, the power storage mechanism being at least partially located toward the first end of the hub shell with respect to the shifting unit.

10. The bicycle internal transmission hub according to claim 9, further comprising
an electronic control unit that is located in the accommodation cavity and controls the electric actuator, the electronic control unit being located toward the first end of the hub shell with respect to the shifting unit.

11. The bicycle internal transmission hub according to claim 10, further comprising
a first support member located toward the first end of the hub shell with respect to the shifting unit to support the shifting unit, the electric actuator being located on the first support member.

12. A bicycle internal transmission hub comprising:
a hub housing including a hub shell having a cylindrical shape and configured to be coupled to a bicycle wheel rim, the hub shell defining an accommodation cavity inside the cylindrical shape, the hub shell including a first end and a second end with respect to a center axis of the hub shell;
a shifting unit located in the accommodation cavity and configured to select one speed stage from a plurality of speed stages;
an electric actuator located in the accommodation cavity to drive the shifting unit, the electric actuator being at least partially located toward the first end of the hub shell with respect to the shifting unit;
a power generation mechanism that generates power used to drive the electric actuator, the power generation mechanism being located in the accommodation cavity at least partially toward the second end of the hub shell with respect to the shifting unit;
a power storage mechanism located in the accommodation cavity and that stores power supplied from the power generation mechanism, the power storage mechanism being at least partially located toward the first end of the hub shell with respect to the shifting unit;
an electronic control unit that is located in the accommodation cavity and controls the electric actuator, the electronic control unit being located toward the first end of the hub shell with respect to the shifting unit;
a first support member located toward the first end of the hub shell with respect to the shifting unit to support the shifting unit, the electric actuator being located on the first support member; and
a second support member located toward the second end of the hub shell with respect to the shifting unit to support the shifting unit, the power generation mechanism being located closer to the second end of the hub shell than the second support member.

13. A bicycle internal transmission hub comprising:
a hub housing including a hub shell having a cylindrical shape and configured to be coupled to a bicycle wheel rim, the hub shell defining an accommodation cavity inside the cylindrical shape, the hub shell including a first end and a second end with respect to a center axis of the hub shell;
a shifting unit located in the accommodation cavity and configured to select one speed stage from a plurality of speed stages;
an electric actuator located in the accommodation cavity to drive the shifting unit, the electric actuator being at least partially located toward the first end of the hub shell with respect to the shifting unit;
a power generation mechanism that generates power used to drive the electric actuator, the power generation mechanism being located in the accommodation cavity at least partially toward the second end of the hub shell with respect to the shifting unit;
a power storage mechanism located in the accommodation cavity and that stores power supplied from the power generation mechanism, the power storage mechanism being at least partially located toward the first end of the hub shell with respect to the shifting unit;

an electronic control unit that is located in the accommodation cavity and controls the electric actuator, the electronic control unit being located toward the first end of the hub shell with respect to the shifting unit; and a first support member located toward the first end of the hub shell with respect to the shifting unit to support the shifting unit, the electric actuator being located on the first support member, the power storage mechanism being located on the first support member.

14. The bicycle internal transmission hub according to claim 11, wherein the electronic control unit is located on the first support member.

15. The bicycle internal transmission hub according to claim 6, further comprising a wireless communication unit electrically connected to the electronic control unit to communicate with an external device.

16. The bicycle internal transmission hub according to claim 15, wherein the wireless communication unit is at least partially located in the accommodation cavity.

17. The bicycle internal transmission hub according to claim 1, further comprising a notification unit that issues a notification of a state of the bicycle internal transmission hub.

18. The bicycle internal transmission hub according to claim 1, wherein the hub shell includes:

a shell body coupled to a rim of a wheel by an intermediate member that is coupled to the rim; and a cover member rotatably arranged on the shell body.

19. The bicycle internal transmission hub according to claim 1, wherein the electric actuator is configured to adjust a rotational angle of the drive shaft corresponding to the one speed stage so that the shifting unit selects the one speed stage.

* * * * *